US009894227B2

(12) United States Patent
Akiyama

(10) Patent No.: US 9,894,227 B2
(45) Date of Patent: Feb. 13, 2018

(54) INFORMATION PROCESSING APPARATUS, INFORMATION PROCESSING SYSTEM, INFORMATION PROCESSING METHOD, AND COMPUTER PROGRAM PRODUCT

(71) Applicant: Takumi Akiyama, Kanagawa (JP)

(72) Inventor: Takumi Akiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/360,204

(22) Filed: Nov. 23, 2016

(65) Prior Publication Data

US 2017/0171407 A1 Jun. 15, 2017

(30) Foreign Application Priority Data

Dec. 9, 2015 (JP) ................................. 2015-240323
May 24, 2016 (JP) ................................. 2016-103504

(51) Int. Cl.
*H04N 1/04* (2006.01)
*H04N 1/00* (2006.01)
(Continued)

(52) U.S. Cl.
CPC ....... *H04N 1/00588* (2013.01); *G06K 9/4604* (2013.01); *G06T 7/0085* (2013.01);
(Continued)

(58) Field of Classification Search
CPC .......... H04N 2201/04729; H04N 2201/04789; H04N 2201/02425; H04N 2201/03162;
(Continued)

(56) References Cited

U.S. PATENT DOCUMENTS

| 5,452,374 | A | * | 9/1995 | Cullen | G06K 9/00463 382/293 |
| 5,764,379 | A | * | 6/1998 | Matsuda | H04N 1/1013 355/23 |
| 6,301,022 | B1 | * | 10/2001 | Washio | H04N 1/00681 358/488 |
| 2009/0026684 | A1 | * | 1/2009 | Kawaguchi | B65H 9/002 270/18 |

(Continued)

FOREIGN PATENT DOCUMENTS

| JP | 2004-186807 | 7/2004 |
| JP | 2009-096613 | 5/2009 |

*Primary Examiner* — Negussie Worku
(74) *Attorney, Agent, or Firm* — Harness, Dickey & Pierce, P.L.C.

(57) ABSTRACT

An information processing apparatus includes a reading unit, an edge extraction unit, a feature point search unit, a document area size calculation unit, a user operation unit, and a multi-feed determination unit. The reading unit optically reads a document to generate image data. The edge extraction unit extracts an edge of the document from the image data. The feature point search unit searches edge data of the edge extracted by the edge extraction unit for a feature point. The document area size calculation unit calculates a document area size from the feature point found by the feature point search unit. The user operation unit is used by a user to specify a document size. The multi-feed determination unit compares the document area size calculated by the document area size calculation unit with the user-specified document size so as to determine whether multi-feed of the document has occurred.

9 Claims, 24 Drawing Sheets

(51) Int. Cl.
*G06T 7/00* (2017.01)
*G06K 9/46* (2006.01)
*G06T 7/60* (2017.01)

(52) U.S. Cl.
CPC ........... *G06T 7/60* (2013.01); *H04N 1/00005* (2013.01); *H04N 1/0005* (2013.01); *H04N 1/00013* (2013.01); *H04N 1/00034* (2013.01); *H04N 1/00352* (2013.01); *H04N 1/00748* (2013.01); *G06T 2207/10008* (2013.01); *G06T 2207/20164* (2013.01)

(58) Field of Classification Search
CPC . H04N 2201/0471; H04N 2201/04731; H04N 2201/04732; H04N 2201/04737; H04N 2201/04787; H04N 2201/04791; H04N 1/00681
USPC .................................................. 358/488, 496
See application file for complete search history.

(56) References Cited

U.S. PATENT DOCUMENTS

| | | | |
|---|---|---|---|
| 2010/0098471 A1* | 4/2010 | Satoh | B65H 7/14 399/361 |
| 2011/0236102 A1* | 9/2011 | Furushige | G03G 15/6576 399/406 |
| 2011/0252449 A1* | 10/2011 | Akiyama | H04N 21/4334 725/50 |
| 2012/0032960 A1* | 2/2012 | Kameyama | H04N 7/17318 345/428 |
| 2014/0197591 A1* | 7/2014 | Inoue | B65H 3/56 271/18 |
| 2015/0048566 A1* | 2/2015 | Utagawa | B65H 1/14 271/10.02 |
| 2015/0319335 A1* | 11/2015 | Baba | H04N 1/047 358/447 |
| 2016/0224873 A1* | 8/2016 | Akiyama | G06K 15/16 |
| 2017/0061794 A1* | 3/2017 | Nishimura | B61L 25/02 |

* cited by examiner (a) TWO DOCUMENTS
DIFFER IN INCLINATION (b) TWO DOCUMENTS
DIFFER IN INCLINATION,
AND INTERSECT AT
ALL SIDES (c) TWO DOCUMENTS
ARE EQUAL IN
INCLINATION (d) TWO DOCUMENTS
ARE EQUAL IN
INCLINATION, AND DO
NOT INTERSECT AT
ANY SIDE

TWO DOCUMENTS OVERLAP
IN INCLUSIVE RELATION

INFORMATION PROCESSING APPARATUS, INFORMATION PROCESSING SYSTEM, INFORMATION PROCESSING METHOD, AND COMPUTER PROGRAM PRODUCT

CROSS-REFERENCE TO RELATED APPLICATIONS

The present application claims priority under 35 U.S.C. §119 to Japanese Patent Application No. 2015-240323, filed on Dec. 9, 2015 and Japanese Patent Application No. 2016-103504, filed on May 24, 2016. The contents of which are incorporated herein by reference in their entirety.

BACKGROUND OF THE INVENTION

1. Field of the Invention

The present invention relates to an information processing apparatus, an information processing system, an information processing method, and a computer program product.

2. Description of the Related Art

A sheet conveyance device, such as an automatic document feeder (ADF), is configured to periodically convey sheets one by one. In some cases, however, trouble occurs that the sheets attract each other due to, for example, static electricity or humidity, and thus, two or more sheets are conveyed in an overlapping manner (hereinafter, referred to as multi-feed). Hence, conventional sheet conveyance devices use methods for detecting the multi-feed using dedicated sensors. For example, a technique is already known that detects a multi-feed state by disposing an ultrasonic sensor so as to interpose the sheet therein, and detecting the paper thickness based on a difference in received signal between a case in which one sheet is conveyed and a case in which multiple sheets are fed.

As a technique for detecting the multi-feed using image processing, for example, an invention disclosed in Japanese Unexamined Patent Application Publication No. 2004-186807 is known. According to this invention, the multi-feed of form sheets is detected using a scanned image of the sheet(s). Specifically, edges, each including a predefined straight line component, of the sheet(s) are detected from the image supplied from the scanner, so as to detect the multi-feed of the form sheets based on the inclination of each of the edges.

However, when two sheets are conveyed in an unaligned state, conventional multi-feed detection mechanisms are sometimes incapable of correctly measuring the paper thickness, and thereby are incapable of detecting the multi-feed. In addition, a sensor dedicated to the multi-feed detection is required, so that the cost of an overall system increases. The known example described above detects the multi-feed by analyzing the image read by the scanner using image processing without providing a dedicated sensor, and is incapable of detecting the multi-feed when the two sheets have the same inclination.

SUMMARY OF THE INVENTION

According to one aspect of the present invention, an information processing apparatus includes a reading unit, an edge extraction unit, a feature point search unit, a document area size calculation unit, a user operation unit, and a multi-feed determination unit. The reading unit optically reads a document to generate image data. The edge extraction unit extracts an edge of the document from the image data generated by the reading unit. The feature point search unit searches edge data of the edge extracted by the edge extraction unit for a feature point. The document area size calculation unit calculates a document area size from the feature point found by the feature point search unit. The user operation unit is used by a user to specify a document size. The multi-feed determination unit compares the document area size calculated by the document area size calculation unit with the user-specified document size so as to determine whether multi-feed of the document has occurred.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
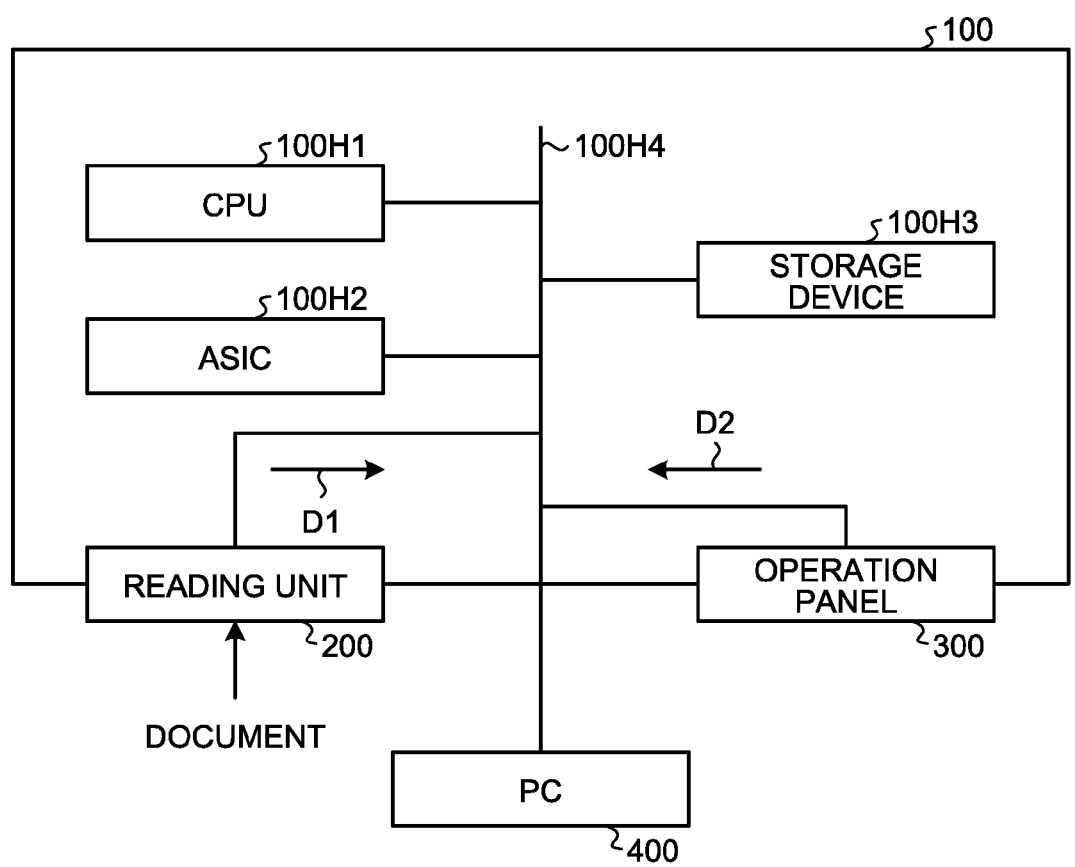
FIG. 1 is a block diagram illustrating an exemplary hardware configuration of an image processing apparatus serving as an information processing apparatus of Example 1 in an embodiment of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to enable the detection of the multi-feed of documents using image processing regardless of how two such documents overlap each other, based on image data of a read image of the documents.

In an embodiment of the present invention, detection of a document multi-feed is performed using image processing as follows: continuity of edges is evaluated and an area size covering a document area is calculated; and the area size is compared with document size entered by a user so as to detect the multi-feed. In addition to this configuration, in the embodiment, character string areas in the document are extracted, and the multi-feed state is detected from the inclination thereof. That is, the present invention differs from the technique described in Japanese Unexamined Patent Application Publication No. 2004-186807 (hereinafter, called the known technique) cited above in that the area size covering the multi-fed documents is calculated, and the multi-feed is detected based on the area size.

The following describes the difference between known technique and the present invention.

Figure 14A:
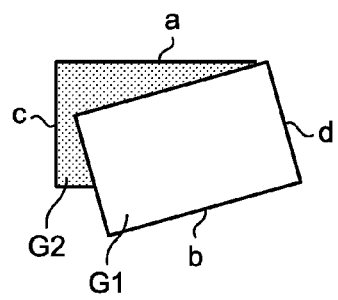
FIGS. 14A to 14C are explanatory diagrams illustrating a method for multi-feed detection according to a known technique.
Figure 14B:
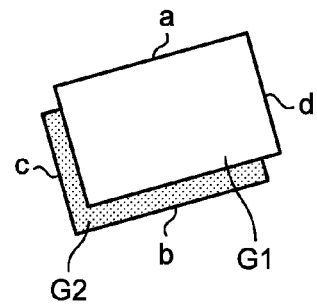
Figure 14C:
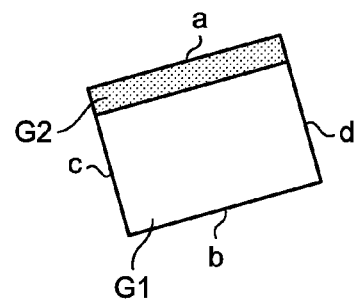

FIGS. 14A to 14C are explanatory diagrams illustrating the method for the multi-feed detection according to the known technique.

In the known technique, the multi-feed is detected according to the following procedure.

1. Edge detection processing is applied to two documents G1 and G2 that are multi-fed, and an upper end edge a, a lower end edge b, a left end edge c, and a right end edge d are detected.

2. Then, inclinations are compared between the upper end edge a and the lower end edge b opposed to each other, or between the left end edge c and the right end edge d opposed to each other.

3. If the comparison indicates that the inclinations disagree between the upper end edge a and the lower end edge b, or between the left end edge c and the right end edge d, the documents are detected to be multi-fed.

For example, in the case of FIG. 14A, the documents are detected to be multi-fed because the inclinations disagree between the upper end edge a and the lower end edge b, or between the left end edge c and the right end edge d.

However, when the inclinations of the two documents G1 and G2 are equal to each other as illustrated in FIG. 14B or 14C, the technique described in Japanese Unexamined Patent Application Publication No. 2004-186807 is incapable of detecting the multi-feed because the inclinations agree between the upper end edge a and the lower end edge b, or between the left end edge c and the right end edge d.

In contrast, in the embodiment of the present invention, the area covering the documents G1 and G2 is detected, and the area size is compared with a user-specified document size so as to detect the multi-feed even when the inclinations of the two documents G1 and G2 are equal to each other.

Figure 15A:
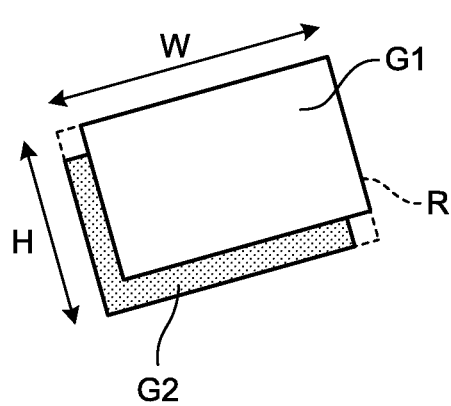
FIGS. 15A and 15B are explanatory diagrams illustrating a method for multi-feed detection in the present invention.
Figure 15B:
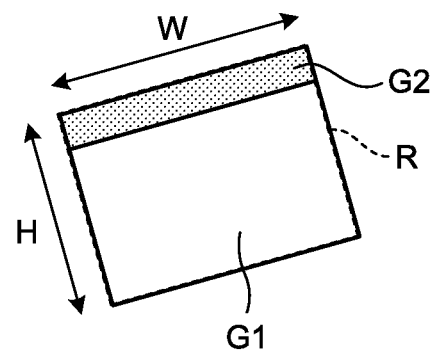

FIGS. 15A and 15B are explanatory diagrams illustrating the method for the multi-feed detection in the embodiment of the present invention.

In the embodiment, the multi-feed is detected according to the following procedure.

1. An area (dotted-line area) R covering the documents G1 and G2 is detected, and a width W and a height H of the area R are calculated (FIGS. 15A and 15B).

2. A main scanning size and a sub-scanning size of the documents G1 and G2 are estimated from W and H thus calculated.

3. A determination is made as to whether the document size specified by the user agree with the main scanning size and the sub-scanning size, and the documents are detected to be multi-fed if the sizes disagree.

This procedure enables the multi-feed detection even when the inclinations of the two documents G1 and G2 are equal to each other, in which case the known technique is incapable of detecting the multi-feed.

The following describes in detail the embodiment of the present invention by way of examples with reference to the drawings.

Example 1

FIG. 1 is a block diagram illustrating an exemplary hardware configuration of an image processing apparatus serving as an information processing apparatus according to Example 1 of the embodiment of the present invention. In FIG. 1, this image processing apparatus 100 includes a central processing unit (CPU) 100H1, an application-specific integrated circuit (ASIC) 100H2, a storage device 100H3, and a bus 100H4.

The CPU 100H1 is an arithmetic device that performs calculations related to various processes executed by the image processing apparatus 100, and that processes image data. The CPU 100H1 is also a control device that controls devices and the like included in the image processing apparatus 100.

The ASIC 100H2 is an electronic circuit that performs various processes related to image processing executed by the image processing apparatus 100, and that processes various types of data, such as the image data. The ASIC 100H2 may be a programmable logic device (PLD), such as a field programmable gate array (FPGA).

The storage device 100H3 stores, for example, data, computer programs, and setting values used by the image processing apparatus 100. The storage device 100H3 is what is called a memory. The storage device 100H3 may include, for example, an auxiliary storage device, such as a hard disk.

A reading unit 200 is connected to hardware in the image processing apparatus 100 through the bus 100H4, and transmits and receives various types of data, such as image data D1, to and from the hardware. An operation panel 300 is connected to hardware in the image processing apparatus 100 through the bus 100H4, and transmits and receives various types of data, such as a user-specified document size D2, to and from the hardware.

The image processing apparatus 100 according to the present embodiment can be connected to, for example, an information processing apparatus (personal computer (PC)) 400 so as to be configured as an information processing system 500. In this case, the image processing apparatus 100 serves as an image reading apparatus. The image processing apparatus 100 can be connected to an image forming apparatus, instead of or in addition to the PC, so as to be configured as the information processing system 500. In this case, the image processing apparatus 100 can also serve as the image reading apparatus of the image forming apparatus.

Figure 2:
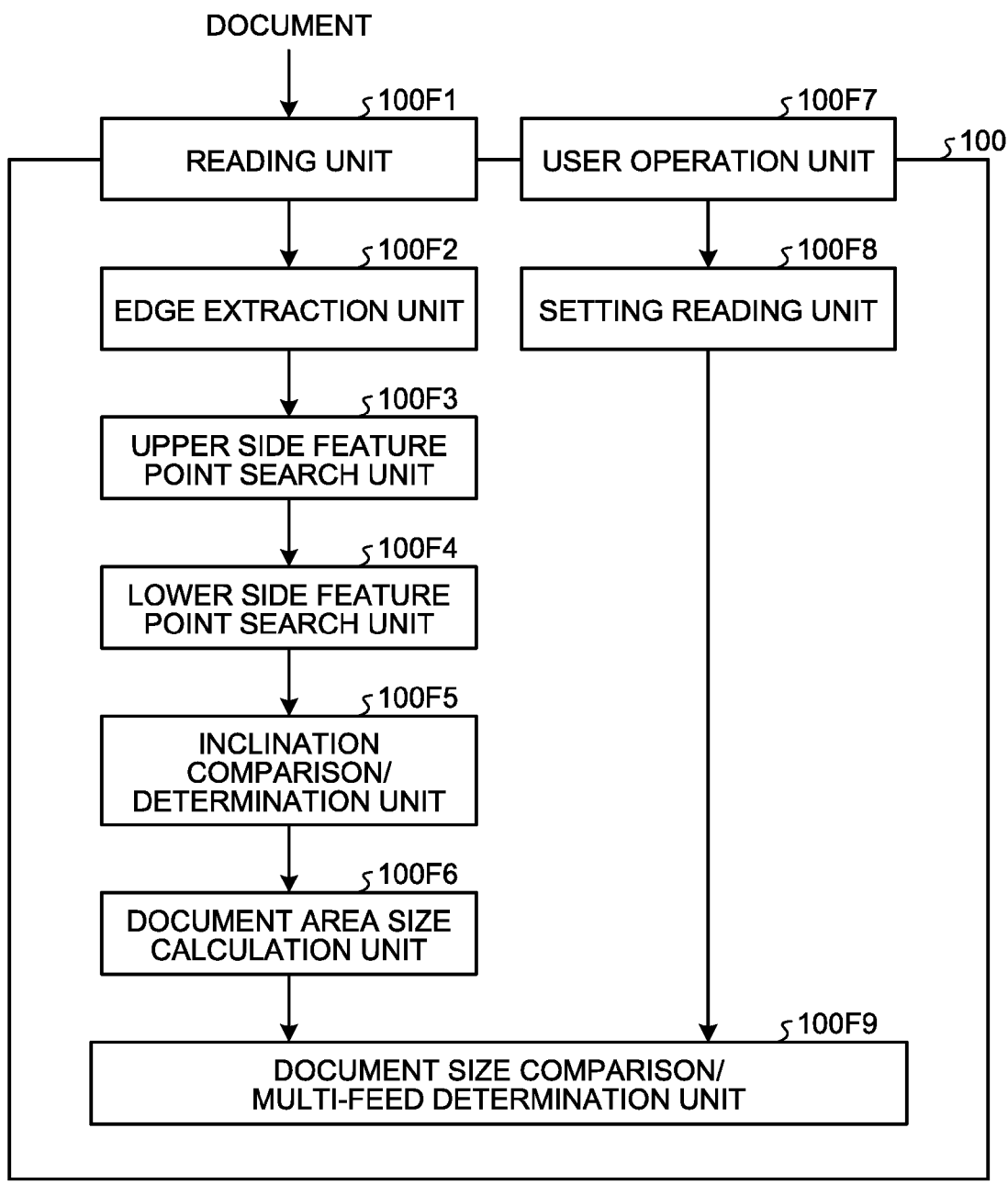
FIG. 2 is a functional block diagram illustrating an exemplary functional configuration of the image processing apparatus illustrated in FIG. 1.

FIG. 2 is a functional block diagram illustrating an exemplary functional configuration of the image processing apparatus. In FIG. 2, the image processing apparatus 100 includes a reading unit 100F1, an edge extraction unit 100F2, an upper side feature point search unit 100F3, a lower side feature point search unit 100F4, an inclination comparison/determination unit 100F5, a document sheet area size calculation unit 100F6, a user operation unit 100F7, a setting reading unit 100F8, and a document size comparison/multi-feed determination unit 100F9.

The reading unit 100F1 is an image reading unit that reads, for example, a document 1, which has an image formed thereon, and a background thereof, and generates the image data D1. The edge extraction unit 100F2 extracts, as edge data, upper side and lower side portions of the document area from the image data D1 so as to generate an edge image. Note that the reference numeral 1 is used when the documents G1 and G2 are collectively called without distinction. The upper side feature point search unit 100F3 detects various feature points at the upper side portion of the edge image generated by the edge extraction unit 100F2. The upper side feature point search unit 100F3 evaluates the continuity of the edge, and if any edge straight line having a sufficient length has not been detected, the document 1 is determined to be in the multi-feed state.

The lower side feature point search unit 100F4 detects various feature points at the lower side portion of the edge image generated by the edge extraction unit 100F2. The lower side feature point search unit 100F4 evaluates the continuity of the edge, and if any edge straight line having a sufficient length has not been detected, the document 1 is determined to be in the multi-feed state. The inclination comparison/determination unit 100F5 calculates an upper side linear equation and a lower side linear equation of the document area based on the various feature points detected by the upper side feature point search unit 100F3 and the lower side feature point search unit 100F4. The inclination comparison/determination unit 100F5 further compares the calculated inclinations of the upper side and the lower side, and if the inclinations disagree, the document 1 is determined to be in the multi-feed state.

The document area size calculation unit 100F6 calculates four pairs of coordinates forming an area covering the document portion from various types of detected information. The document area size calculation unit 100F6 further calculates a document area size from the coordinate information.

The user specifies a size of the document 1 to be read through the user operation unit 100F7, so that the user-specified document size D2 is generated. The setting reading unit 100F8 reads the document size specified by a user from the user operation unit 100F7. The document size comparison/multi-feed determination unit 100F9 compares the document area size calculated by the document area size calculation unit 100F6 with the user-specified document size set by the setting reading unit 100F8. If the sizes disagree, the document 1 is determined to be in the multi-feed state. In this manner, the user enters the document size through the user operation unit 100F7, and thereby, the data serving as the basis for determination of the multi-feed state can be obtained.

Figure 3:
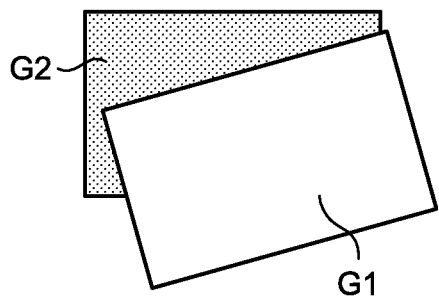
FIG. 3 is an explanatory diagram illustrating examples of overlapping states of documents to be determined.
Figure 3:
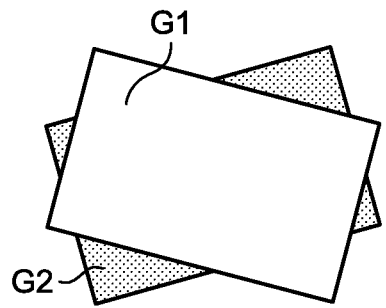
Figure 3:
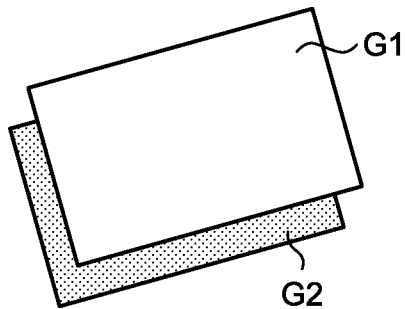
Figure 3:
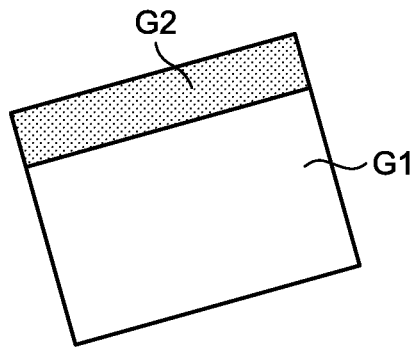

FIG. 3 is an explanatory diagram illustrating examples of overlapping states of documents to be determined. For ease of understanding, the document G2 that is lower one of the two overlapping documents G1 and G2 is filled with shading. In the present embodiment, if the documents G1 and G2 are multi-fed and read by the reading unit 100F1, the state is determined to be one of four broadly classified states illustrated in (a) to (c) of FIG. 3, and if the state is determined to correspond to any one of these states, the documents are detected to be multi fed. The four states are the following states.

The two documents G1 and G2 differ in inclination ((a) of FIG. 3).

The two documents G1 and G2 differ in inclination, and intersect at all sides thereof ((b) of FIG. 3).

The two documents G1 and G2 are equal in inclination ((c) of FIG. 3).

The two documents G1 and G2 are equal in inclination, and do not intersect at any side thereof ((d) of FIG. 3).

Figure 4:
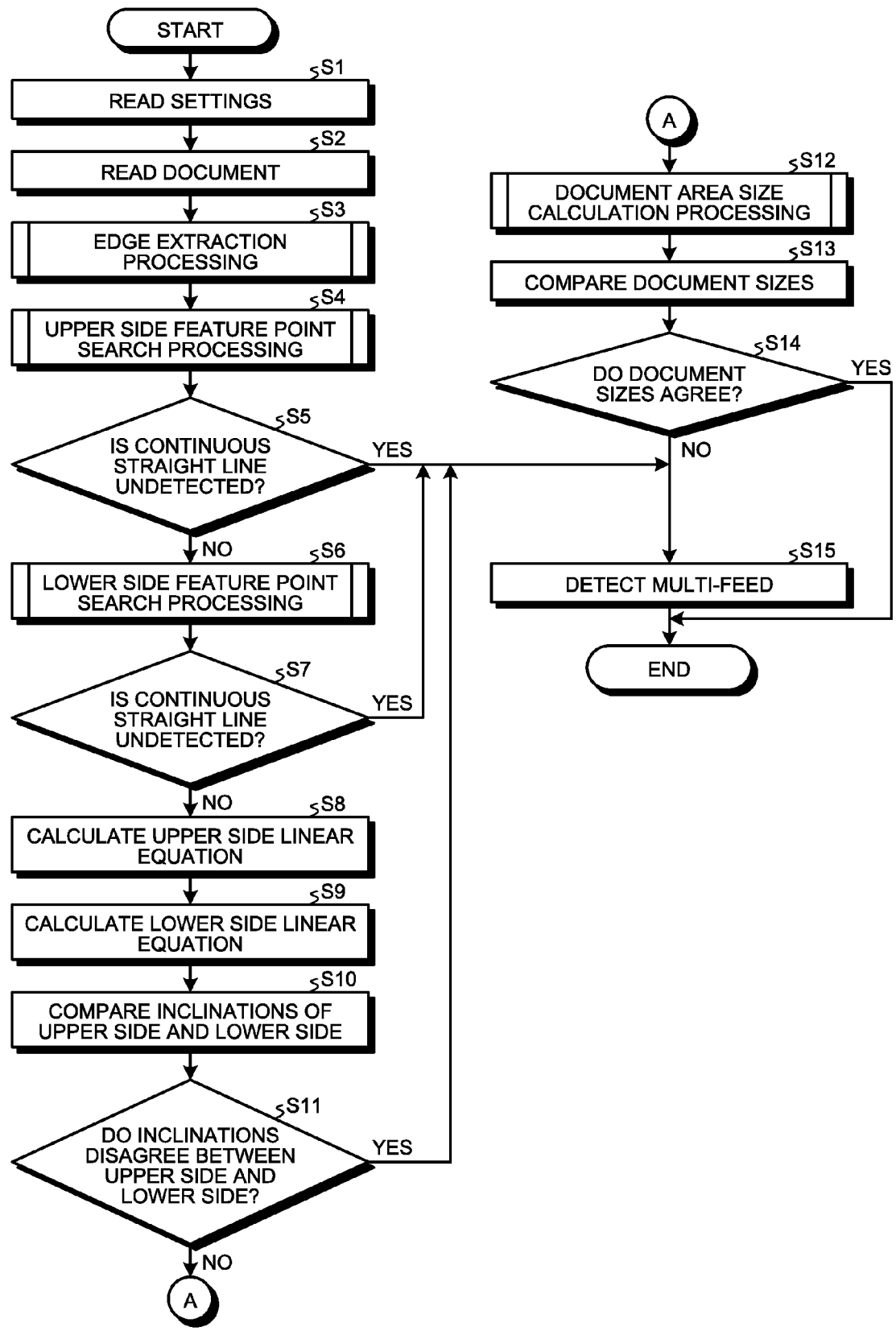
FIG. 4 is a flowchart illustrating an exemplary procedure of overall processing of the image processing apparatus according to Example 1.

FIG. 4 is a flowchart illustrating an exemplary procedure of overall processing of the image processing apparatus according to the present embodiment.

In FIG. 4, first, the user places the document 1 on a document tray of the ADF, and sets the size of the document to be read through the user operation unit 100F7. The setting reading unit 100F8 receives the size information of the document to be read from the user operation unit 100F7 (Step S1). After a read instruction of the document 1 is entered, the reading unit 100F1 reads the document 1 (Step S2). The edge extraction unit 100F2 applies various types of processing, including edge extraction filter processing, binarization, and denoising, to the read image data D1, and extracts the upper side and the lower side portions of the document area as the edge information, so as to generate the edge image (Step S3).

The upper side feature point search unit 100F3 detects the various feature points at the upper side portion of the edge image generated by the edge extraction unit 100F2 (Step S4). The upper side feature point search unit 100F3 evaluates the continuity of the edge information, and if any edge straight line having a sufficient length has not been detected (for example, in the state of (b) of FIG. 3; Yes at Step S5), the document 1 is determined to be in the multi-feed state (Yes at Step S15). Specifically, the sufficient length of the edge straight line corresponds to a length reaching the length of the upper side of the document, the upper side portion of the edge image of which is to be detected as the edge. If the length of the edge strait line is smaller than the length reaching the length of the upper side of the document 1, the edge strait line can be determined to be intersecting another edge straight line.

If an edge straight line having a sufficient length has been successfully detected (No at Step S5), the lower side feature point search unit 100F4 detects the various feature points at the lower side portion of the edge image generated by the edge extraction unit 100F2 (Step S6). The lower side feature point search unit 100F4 evaluates the continuity of the edge, and if any edge straight line having a sufficient length has not been detected (for example, in the state of (b) of FIG. 3; Yes at Step S7), the document 1 is determined to be in the multi-feed state (Step S15). In the case of the lower side portion, in the same manner as in the case of the upper side portion, if the lower side of the document G1 intersects that of the document G2, the edge straight line does not have a sufficient length corresponding to the length of the lower side of the document, so that the edge strait line can be determined to be intersecting another edge straight line.

If an edge straight line having a sufficient length has been successfully detected (No at Step S7), the inclination comparison/determination unit 100F5 calculates the upper side linear equation and the lower side linear equation of the document area based on the various feature points detected by the upper side feature point search unit 100F3 and the lower side feature point search unit 100F4 (Steps S8 and S9).

The inclination comparison/determination unit 100F5 further compares the calculated inclinations of the upper side and the lower side (Step S10), and if the inclinations disagree (for example, in the state of (a) of FIG. 3; Yes at Step S11), the document 1 is determined to be in the multi-feed state (Step S15). If the inclinations agree (No at Step S11), the document area size calculation unit 100F6 calculates the four pairs of coordinates forming the area covering the document portion from various types of detected information. The document area size calculation unit 100F6 further calculates the document area size from the coordinate information (Step S12).

The document size comparison/multi-feed determination unit 100F9 compares the document area size calculated by the document area size calculation unit 100F6 with the user-specified document size set by the setting reading unit 100F8 (Step S13). If the document sizes disagree (for example, in the state of (c) of FIG. 3 or (d) of FIG. 3; No at Step S14), the document 1 is determined to be in the multi-feed state (Step S15).

Figure 5:
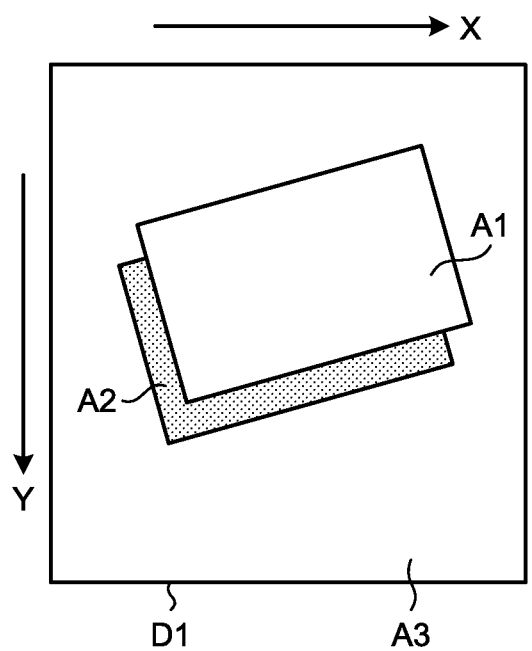
FIG. 5 is a diagram illustrating an example of an image read by the image processing apparatus when the documents are multi-fed.

FIG. 5 is a diagram illustrating an example of an image read by the image processing apparatus when the documents are multi-fed.

The image data D1 of the read image is constituted by first document data A1, second document data A2, and background area data A3 of the multi-fed documents G1 and G2.

Figure 6:
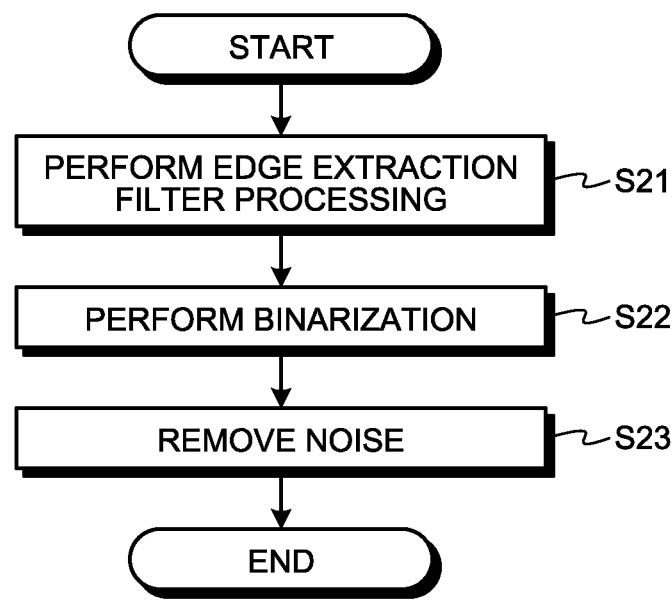
FIG. 6 is a flowchart illustrating a procedure of edge extraction processing of the image processing apparatus according to Example 1.

FIG. 6 is a flowchart illustrating a procedure of edge extraction processing.

In FIG. 6, the image processing apparatus 100 applies filter processing to the read image data D1 to extract a pixel group with greatly changed density as an edge (Step S21). The image processing apparatus 100 then binarizes the edge extraction image generated at Step S21 based on a certain threshold (Step S22). The image created at Step S22 may have small remaining noise caused by, for example, a variation in luminance value in the image, in some cases. This noise causes erroneous detection in subsequent edge search processing, and therefore should preferably be removed. Hence, the image processing apparatus 100 subsequently uses, for example, a low-pass filter to remove the noise contained in the background area data A3 in the edge extraction image that has been binarized at Step S22 (Step S23).

Figure 7A:
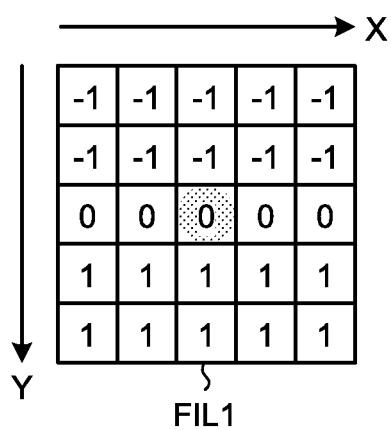
FIGS. 7A and 7B are diagrams illustrating an exemplary processing result of the edge extraction processing according to the flowchart of FIG. 6.
Figure 7B:
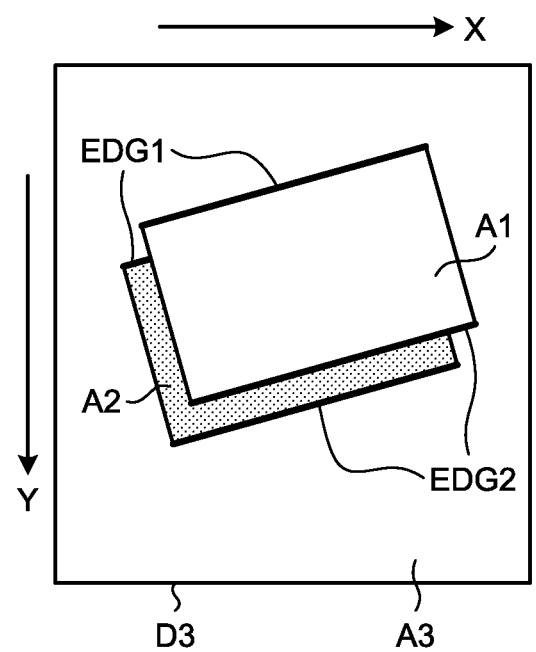

FIGS. 7A and 7B are diagrams illustrating an exemplary processing result of the edge extraction processing by the image processing apparatus according to the present embodiment.

FIG. 7A illustrates an example of the filter used in the edge extraction filter processing at Step S21. Using a filter FIL1 for the image data D1, the processes illustrated in FIG. 6 are performed. The filter FIL1 is a filter for performing first-order differentiation, and extracts a place where pixels with greatly changed density continuously lie in the lateral direction.

As a result of the edge extraction processing using the filter FIL1 for the image data D1, image data D3 is generated as illustrated in FIG. 7B. In the image data D3, EDG1 denotes the extracted edge data at the upper side of the document, and EDG2 denotes the extracted edge data at the lower side of the document.

The filter FIL1 is what is called a Prewitt filter. Alternatively, the filter may be implemented as, for example, a Laplacian filter, a Sobel filter, or a Roberts filer.

Figure 8:
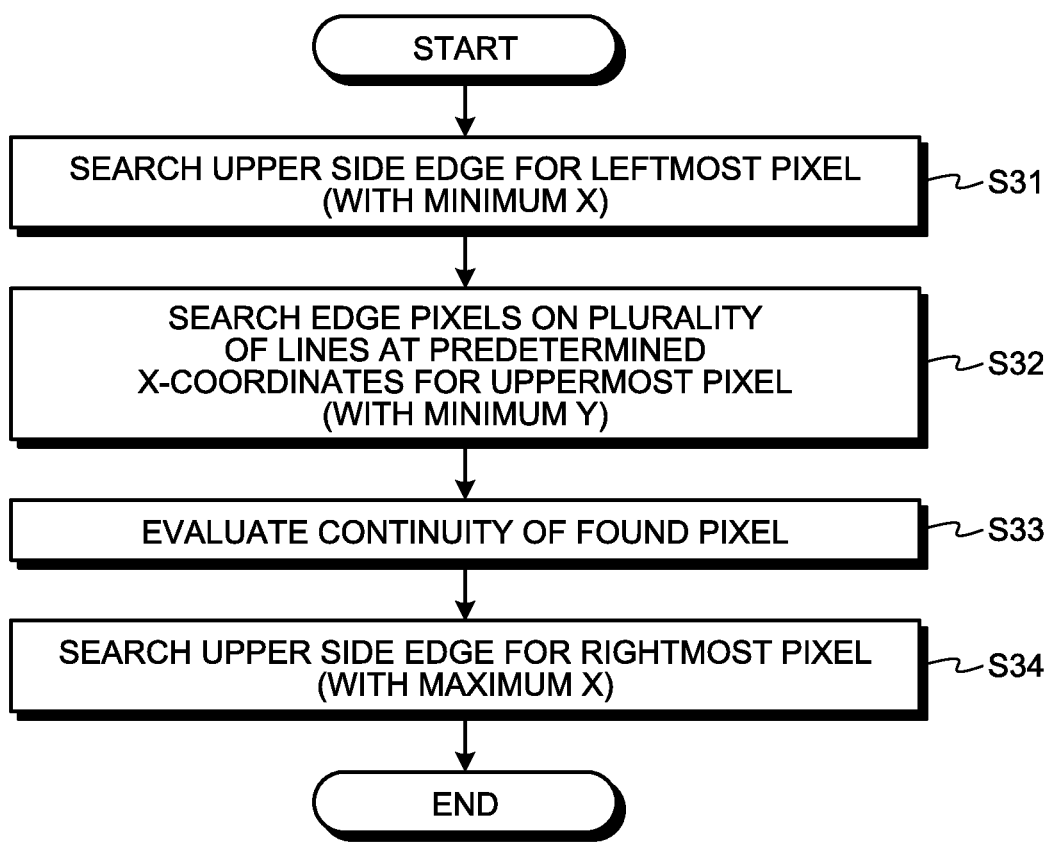
FIG. 8 is a flowchart illustrating an exemplary procedure of upper side feature point search processing of the image processing apparatus according to Example 1.

FIG. 8 is a flowchart illustrating an exemplary procedure of upper side feature point search processing of the image processing apparatus according to the present embodiment.

The upper side feature point search unit 100F3 detects the various feature points (upper side straight line representative points, upper side left end edge coordinates, and upper side right end edge coordinates) at the upper side portion of the edge image generated by the edge extraction unit 100F2. The upper side feature point search unit 100F3 searches the upper side edge data EDG1 for the leftmost pixel (with minimum X), and stores the coordinate values thereof as the upper side left end edge coordinates (Step S31).

The upper side feature point search unit 100F3 then scans the image in the Y-direction along a plurality of lines at predetermined X-coordinates, and obtains the uppermost representative point (with minimum Y) on the upper side edge data EDG1 (Step S32). The upper side feature point search unit 100F3 evaluates the continuity of the representative point found at Step S32, and determines whether the upper side edge data EDG1 is a straight line having a sufficient length (Step S33). The upper side feature point search unit 100F3 searches the upper side edge data EDG1 for the rightmost pixel (with maximum X), and stores the coordinate values thereof as the upper side right end edge coordinates (Step S34). In this manner, four representative points are found.

Figure 9:
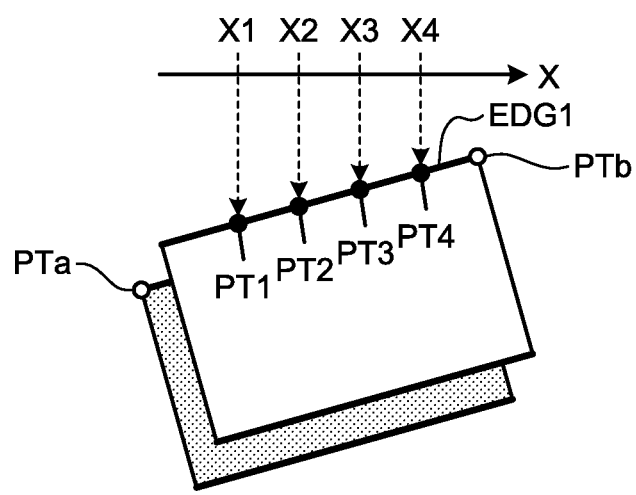
FIG. 9 is an explanatory diagram illustrating an example of the upper side feature point search processing according to the flowchart of FIG. 8.

FIG. 9 is an explanatory diagram illustrating an example of the upper side feature point search processing of the image processing apparatus according to the present embodiment.

As described with reference to the flowchart of FIG. 8, the search processing is performed on the upper side edge data EDG1 to detect the upper side left end edge coordinates serving as the leftmost coordinates (with minimum X) of the upper side edge data EDG1, the representative points on the upper side edge data EDG1, and the upper side right end edge coordinates serving as the rightmost coordinates (with maximum X) of the upper side edge data EDG1.

For example, in the case of detecting four pixels as the representative points in FIG. 9, coordinates PTa serve as the upper side left end edge coordinates; coordinates PT1, PT2, PT3, and PT4 serve as those of the upper side straight line representative points; and coordinates PTb serve as the upper side right end edge coordinates.

Figure 10:
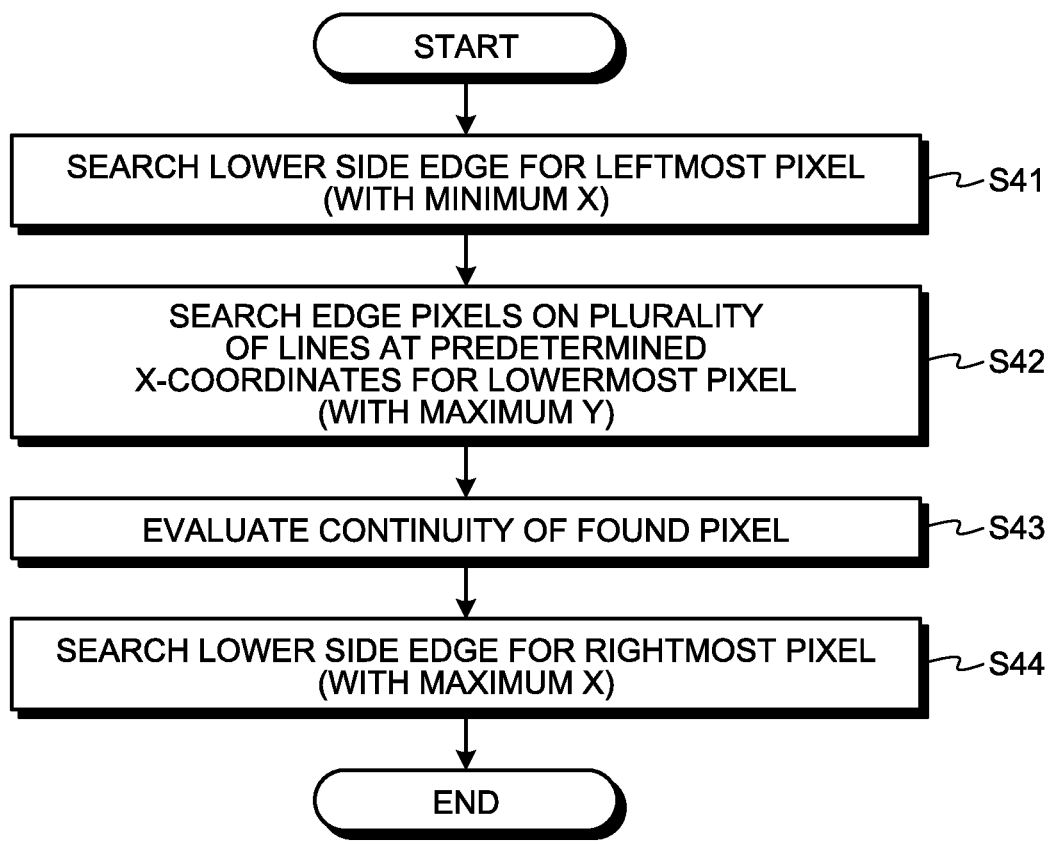
FIG. 10 is a flowchart illustrating an exemplary procedure of lower side feature point search processing of the image processing apparatus according to Example 1.

FIG. 10 is a flowchart illustrating an exemplary procedure of lower side feature point search processing of the image processing apparatus according to the present embodiment.

The lower side feature point search unit 100F4 detects the various feature points (lower side straight line representative points, lower side left end edge coordinates, and lower side right end edge coordinates) at the lower side portion of the edge image generated by the edge extraction unit 100F2. The lower side feature point search unit 100F4 searches the lower side edge data EDG2 for the leftmost pixel (with minimum X), and stores the coordinate values thereof as the lower side left end edge coordinates (Step S41). The lower side feature point search unit 100F4 then scans the image in the Y-direction along a plurality of lines at predetermined X-coordinates, and obtains the lowermost representative point (with maximum Y) on the lower side edge data EDG2 (Step S42).

The lower side feature point search unit 100F4 evaluates the continuity of the representative point found at Step S42, and determines whether the lower side edge data EDG2 is a straight line having a sufficient length (Step S43). The lower side feature point search unit 100F4 searches the lower side edge data EDG2 for the rightmost pixel (with maximum X), and stores the coordinate values thereof as the lower side right end edge coordinates (Step S44). In this manner, four representative points are found.

Figure 11:
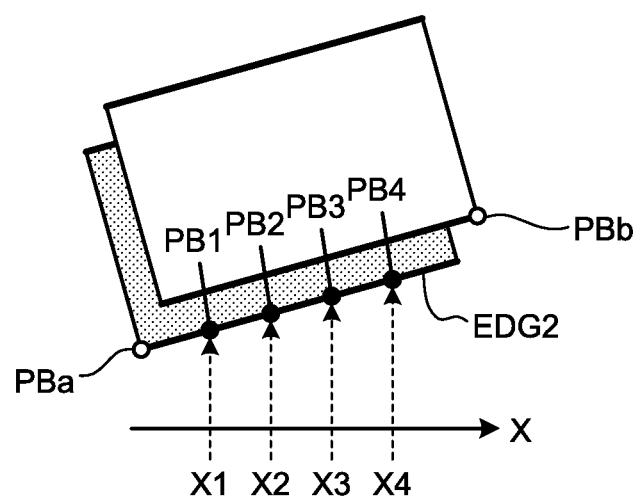
FIG. 11 is an explanatory diagram illustrating an example of the lower side feature point search processing according to the flowchart of FIG. 10.

FIG. 11 is an explanatory diagram illustrating an example of the lower side feature point search processing of the image processing apparatus according to the present embodiment.

As described with reference to the flowchart of FIG. 10, the search processing is performed on the lower side edge data EDG2 to detect the lower side left end edge coordinates serving as the leftmost coordinates (with minimum X) of the lower side edge data EDG2, the representative points on the lower side edge data EDG2, and the lower side right end edge coordinates serving as the rightmost coordinates (with maximum X) of the lower side edge data EDG2.

For example, in the case of detecting four pixels as the representative points in FIG. 11, coordinates PBa serve as the lower side left end edge coordinates; coordinates PB1, PB2, PB3, and PB4 serve as those of the lower side straight line representative points; and coordinates PBb serve as the lower side right end edge coordinates.

Figure 12:
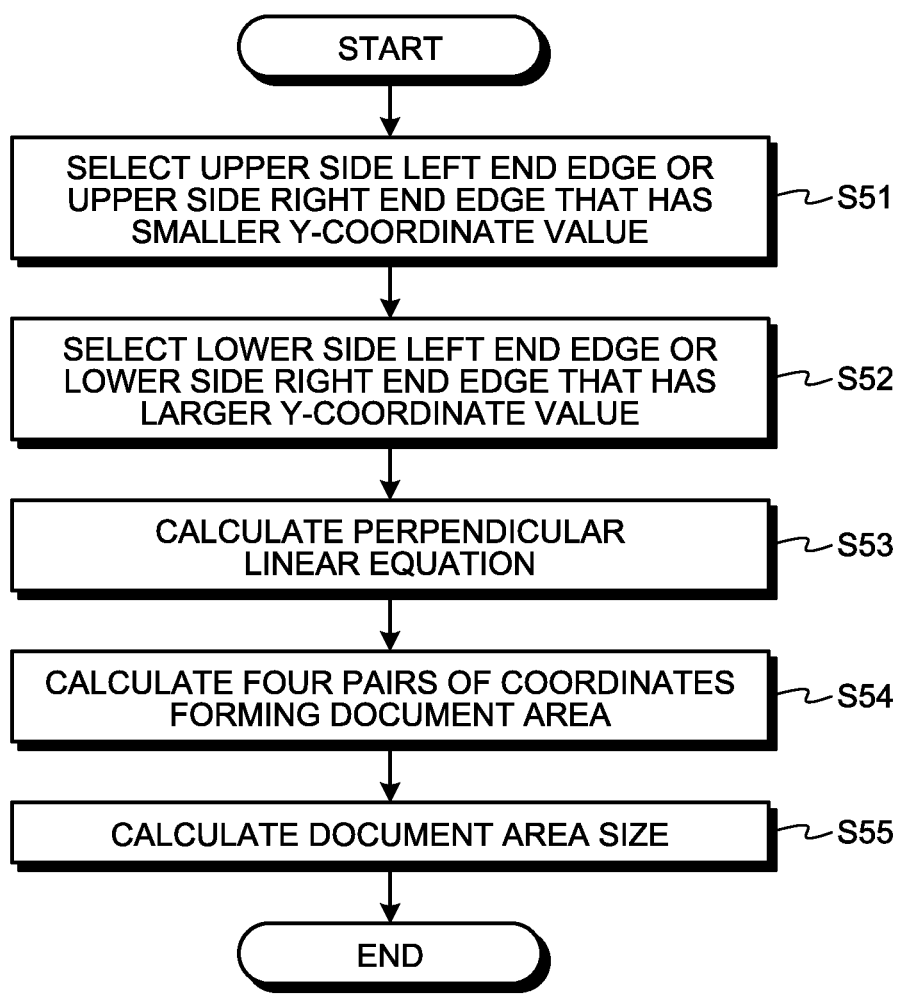
FIG. 12 is a flowchart illustrating an exemplary procedure of document area size calculation processing of the image processing apparatus according to Example 1.

FIG. 12 is a flowchart illustrating an exemplary procedure of document area size calculation processing of the image processing apparatus according to the present embodiment.

The document area size calculation unit 100F6 calculates the four pairs of coordinates forming the area covering the document portion from the various types of detected information. The document area size calculation unit 100F6 further calculates the document area size from the coordinate information. The document area size calculation unit 100F6 selects either the upper side left end edge coordinates or the upper side right end edge coordinates that have a smaller Y-coordinate value (Step S51). The document area size calculation unit 100F6 then selects either the lower side left end edge coordinates or the lower side right end edge coordinates that have a larger Y-coordinate value (Step S52).

The document area size calculation unit 100F6 calculates a linear equation that passes through the coordinates selected at Step S51 and is perpendicular to the upper side linear equation. The document area size calculation unit 100F6 also calculates a linear equation that passes through the coordinates selected at Step S52 and is perpendicular to the lower side linear equation (Step S53). The document area size calculation unit 100F6 calculates four pairs of coordinates at which the upper side linear equation, the lower side linear equation, and the linear equations calculated at Step S53 intersect one another (Step S54). The document area size calculation unit 100F6 calculates the size of the area covering the document portion from the four pairs of coordinates calculated at Step S54 (Step S55).

Figure 13A:
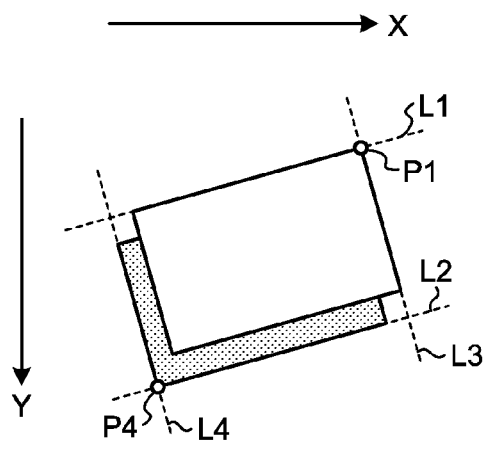
FIGS. 13A and 13B are explanatory diagrams illustrating an example of the document area size calculation processing according to the flowchart of FIG. 12.
Figure 13B:
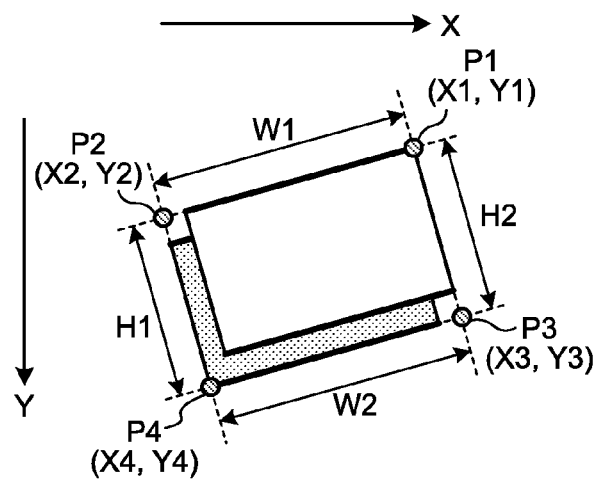

FIGS. 13A and 13B are explanatory diagrams illustrating an example of the document area size calculation processing of the image processing apparatus according to the present embodiment.

The document area size calculation unit 100F6 compares the upper side left end edge coordinates PTa with the upper side right end edge coordinates PTb that are illustrated in FIG. 9, and selects either of them with a smaller Y-coordinate as coordinates P1, as illustrated in FIG. 13A. The document area size calculation unit 100F6 further compares the lower side left end edge coordinates PBa with the lower side right end edge coordinates PBb that are illustrated in FIG. 11, and selects either of them with a larger Y-coordinate as coordinates P4, as illustrated in FIG. 13A.

The document area size calculation unit 100F6 then calculates a linear equation L3 that passes through the coordinates P1 and is perpendicular to an upper side linear equation L1. The document area size calculation unit 100F6 also calculates a linear equation L4 that passes through coordinates P2 and is perpendicular to a lower side linear equation L2. The document area size calculation unit 100F6 then calculates four pairs of coordinates P1, P2, P3, and P4 at which the straight lines L1, L2, L3, and L4 intersect one another. The document area size calculation unit 100F6 finally calculates distances W1, W2, H1, and H2 between the respective pairs of coordinates from the coordinates P1, P2, P3, and P4.

The distance W1 or W2 serves as main scanning size of the detected document area. The distance H1 or H2 swerves as sub-scanning size on the detected document area. The document area size can be calculated from these distances.

The control procedures illustrated in the flowcharts of FIGS. 2, 4, 6, 8, 10, and 12 are configured as a computer program, which is downloaded from the storage device 100H3 of the image processing apparatus 100 to the CPU 100H1, and is executed. The computer program may be stored in a recording medium. In that case, the recording medium can be used to install the computer program into the CPU 100H1. The recording medium may be a non-transitory recording medium. The non-transitory recording medium is not limited. For example, a recording medium, such as a compact disc read-only memory (CD-ROM), can be used as the non-transitory recording medium.

Example 2

Figure 16:
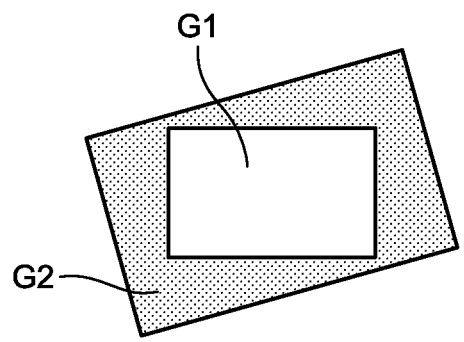
FIG. 16 is an explanatory diagram illustrating an overlapping state in which the documents to be determined are in an inclusive relation.

In Example 1, the multi-feed can be detected when the sides of the two documents G1 and G2 overlap one another or when the two documents G1 and G2 are equal in inclination as illustrated in (a) to (d) of FIG. 3. When, however, as illustrated in FIG. 16, the two documents G1 and G2 are in an inclusive relation, the multi-feed is undetectable. Example 2 is an example that enables the detection of the multi-feed even when the two documents G1 and G2 are (or the image data thereof is) in such an inclusive relation. Specifically, the continuity of the edges is evaluated; the area size covering the documents is calculated; the area size is compared with the document size entered by the user; and moreover, the character string areas in the document are extracted, and the multi-feed state is detected from the information on the inclination thereof.

In the following description of Example 2, configurations and functions different from those of Example 1 will be described. Components that are the same as or similar to those of Example 1 will be denoted by the same reference numerals, and the description thereof will not be repeated.

Figure 17:
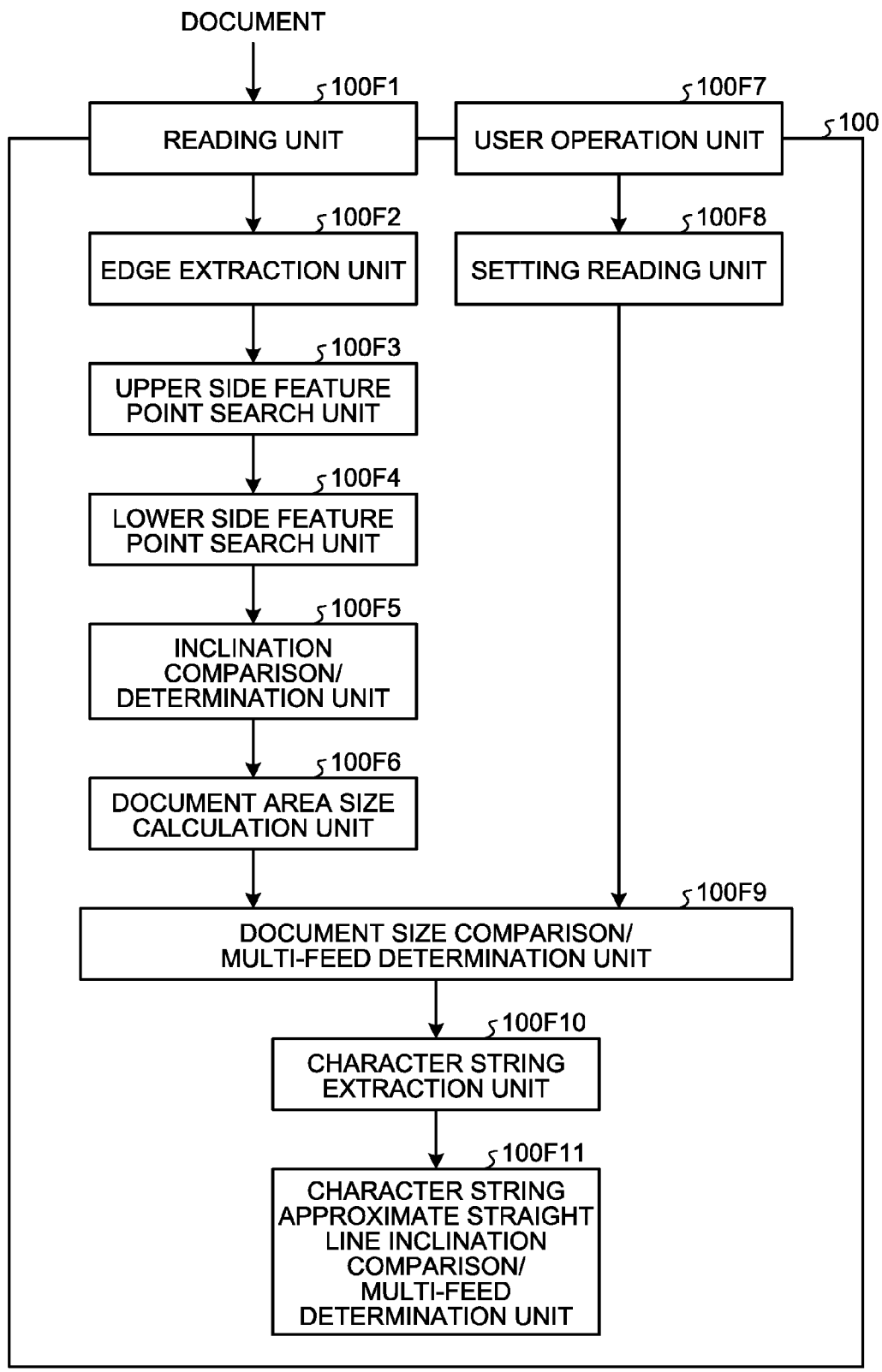
FIG. 17 is a functional block diagram illustrating an exemplary functional configuration of the image processing apparatus according to Example 2.

The hardware configuration of the image processing apparatus 100 according to Example 2 is the same as that of Example 1 illustrated in FIG. 1. FIG. 17 is a functional block diagram illustrating an exemplary functional configuration of the image processing apparatus 100 according to Example 2. In FIG. 17, the image processing apparatus 100 includes the reading unit 100F1, the edge extraction unit 100F2, the upper side feature point search unit 100F3, the lower side feature point search unit 100F4, the inclination comparison/determination unit 100F5, the document area size calculation unit 100F6, the user operation unit 100F7, the setting reading unit 100F8, the document size comparison/multi-feed determination unit 100F9, a character string extraction unit 100F10, and a character string approximate straight line inclination comparison/multi-feed determination unit 100F11. The configuration of Example 2 is obtained by adding the character string extraction unit 100F10 and the character string approximate straight line inclination comparison/multi-feed determination unit 100F11 to that of the Example 1. The rest of the configuration ranging from the reading unit 100F1 to the document area size calculation unit 100F6 is the same as that of the Example 1. The character string extraction unit 100F10 extracts the character string areas each constituting a line in the document from the image data D1, and calculate approximate linear equations for the character string areas. The character string approximate straight line inclination comparison/multi-feed determination unit 100F11 compares inclinations of the straight lines based on the approximate linear equations for the respective character string areas calculated by the character string extraction unit 100F10. If a portion where the inclinations disagree is found, the document is determined to be in the multi-feed state.

Figure 18:
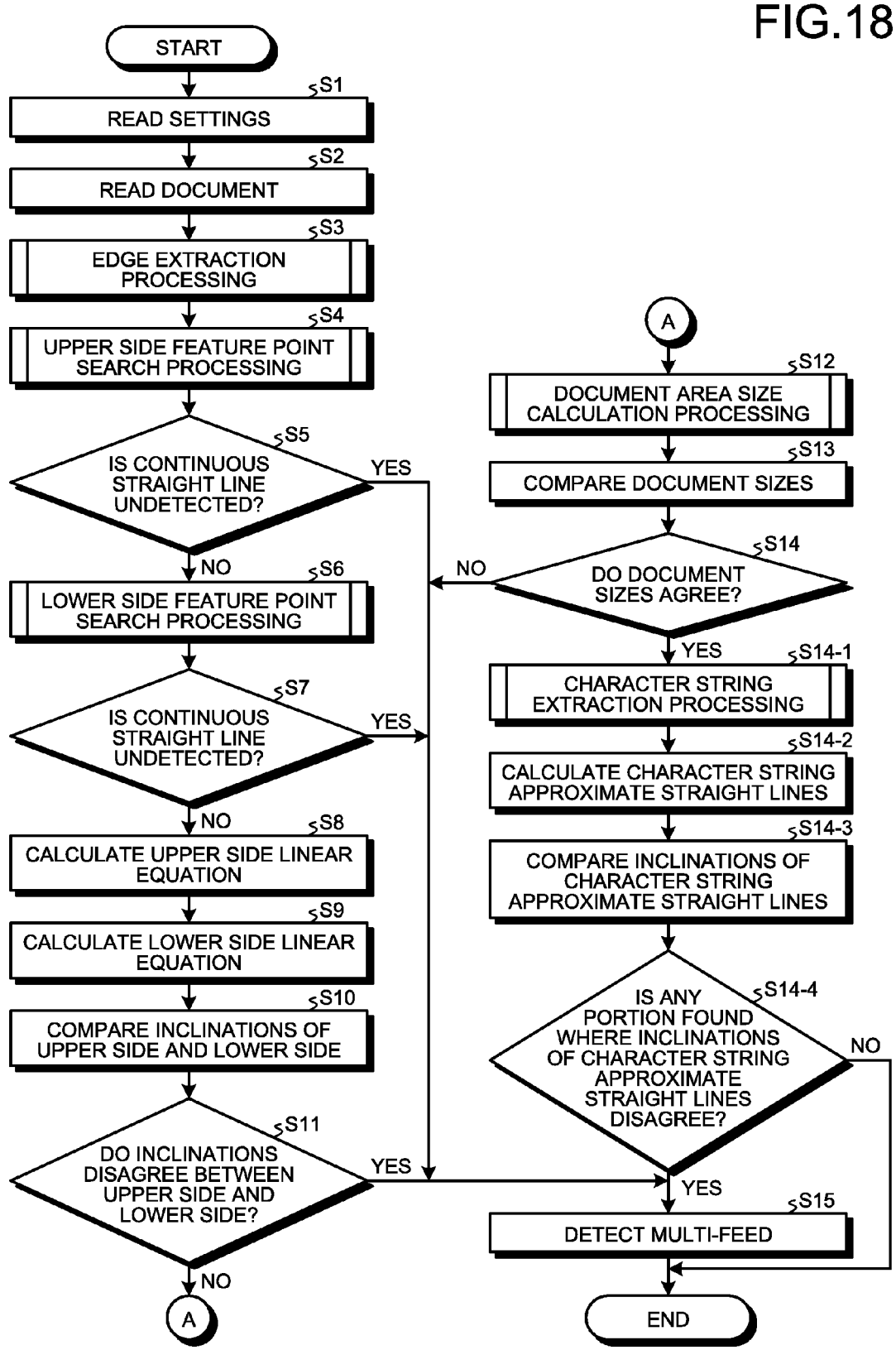
FIG. 18 is a flowchart illustrating exemplary overall processing in the image processing apparatus according to Example 2.

FIG. 18 is a flowchart illustrating exemplary overall processing in the image processing apparatus 100 according to Example 2. In the procedure of FIG. 18, in addition to the procedure of FIG. 4 in Example 1, processing of Steps S14-2 to S14-4 is performed to detect the multi-feed of the document between the processing of Step S14 and the processing of Step S15. That is, also in Example 2, the same processing as that of the Example 1 is performed from Step S1 to Step S14, and if the document sizes disagree (for example, in the state of (c) or (d) of FIG. 3) at Step S14, the document is determined to be in the multi-feed state at Step S15.

If the document sizes agree at Step S14 (Yes at Step S14), the character string extraction unit 100F10 applies character string extraction processing to the read image data D1 to extract character string blocks in the document from the image data (Step S14-1). After the character string blocks are extracted in the character string extraction processing, the character string approximate straight line inclination comparison/multi-feed determination unit 100F11 uses an (character string) approximate straight line calculation unit to calculate the approximate linear equations for the character string blocks extracted at Step S14-1 (Step S14-2). The approximate straight line calculation unit corresponds to a processing unit for Step S14-2. The character string approximate straight line inclination comparison/multi-feed determination unit 100F11 further compares inclinations of the character string blocks based on the approximate linear equations for the character string blocks calculated at Step S14-2 (Step S14-3). Step S14-3 serves as an approximate straight line inclination comparison unit for the character strings. The approximate straight line inclination comparison unit compares the inclinations of the character string blocks, and if a portion is found where a character string block has a different inclination from that of a character string block located before or after thereof, for example, similarly to the state illustrated in FIG. 16, (Yes at Step S14-4), the document is determined to be in the multi-feed state (Step S15). If any portion having a different inclination is not found (No at Step S14-4), no multi-feed is present, and hence, this process ends.

Figure 19:
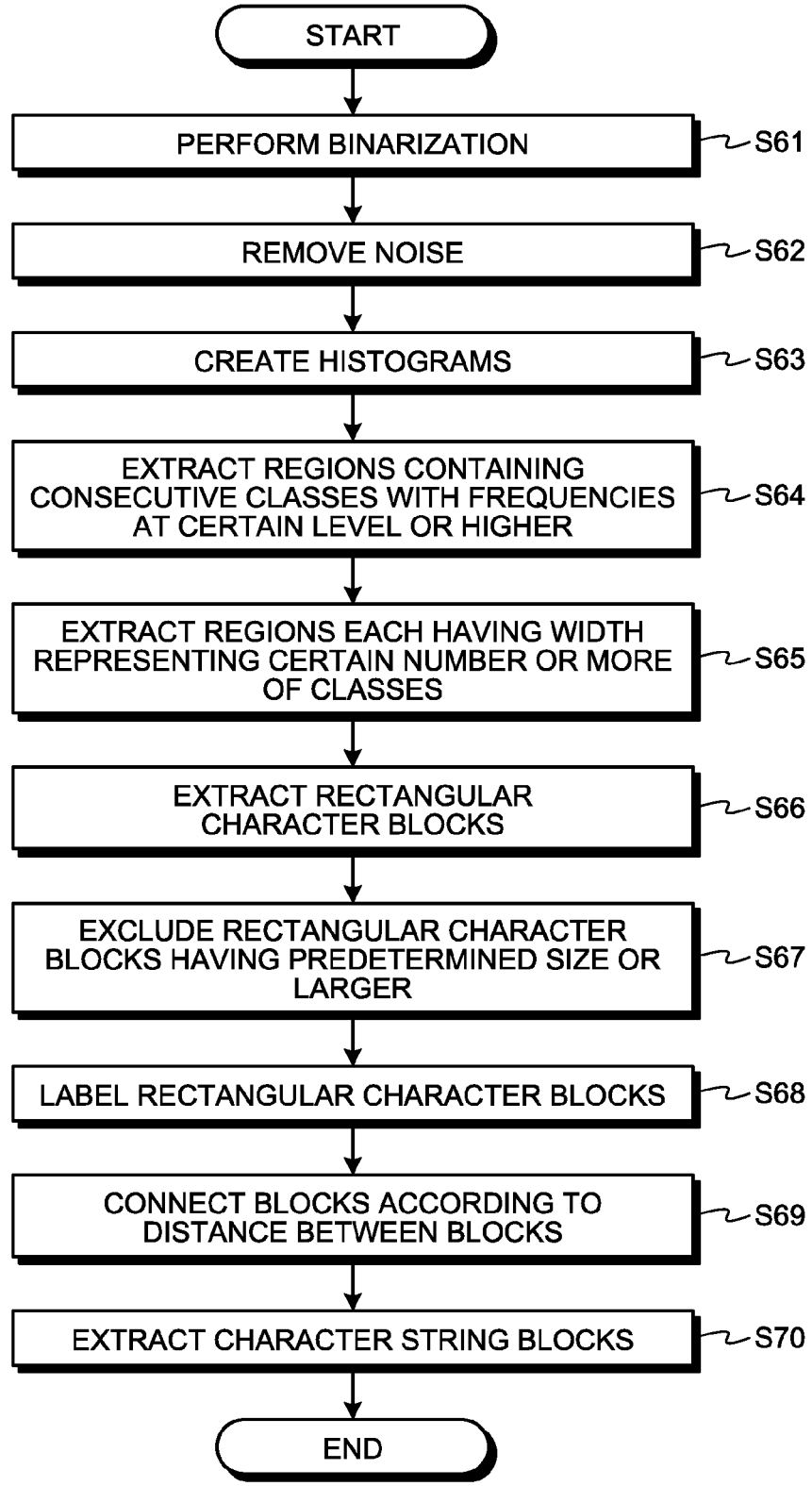
FIG. 19 is a flowchart illustrating an exemplary procedure of character string area extraction processing at Step S14-1 in FIG. 18.

FIG. 19 is a flowchart illustrating an exemplary procedure of the character string area extraction processing at Step S14-1. In FIG. 19, the character string extraction unit 100F10 first binarizes the read image data D1 based on a certain threshold (Step S61). The image created at Step S61 may have small remaining noise caused by, for example, a variation in luminance value in the image, in some cases. This noise causes erroneous detection in rectangular character block extraction processing at the subsequent step (Step S66). Such noise should preferably be removed. Hence, the character string extraction unit 100F10 uses, for example, a low-pass filter to remove the noise contained in the image that has been binarized at Step S61 (Step S62).

The character string extraction unit 100F10 creates histograms for the horizontal direction and the vertical direction of the image that has been denoised at Step S62 (Step S63). In each of the histograms created at Step S63, the number of classes represents the number of pixel positions in one line in the horizontal direction or the vertical direction, and the frequency represents the number of black pixels present in the line. For each of the horizontal and vertical histograms created at Step S63, the character string extraction unit 100F10 stores positions of regions containing consecutive classes with frequencies at a certain level or higher and widths representing the numbers of classes of the regions (Step S64). The character string extraction unit 100F10 further extracts only regions each having a width representing a certain number or more of classes from among the regions extracted at Step S64 (Step S65). The character string extraction unit 100F10 then creates rectangular regions covering respective characters in the document as rectangular character blocks from the pieces of region information in the horizontal direction and the vertical direction extracted at Step S65 (Step S66).

After extracting the rectangular character blocks at Step S66, the character string extraction unit 100F10 calculates the area of each of the rectangular character blocks, and excludes rectangular character blocks having a predetermined size or larger (Step S67). This is performed to distinguish a character portion from a picture portion in the image. The character string extraction unit 100F10 labels the rectangular character blocks extracted at Step S67 (Step S68). The character string extraction unit 100F10 compares distances between the rectangular character blocks that have been labeled at Step S68, and if blocks are present that lie within a predetermined distance therebetween, performs connection processing to connect the blocks to each other into one block (Step S69). The character string extraction unit 100F10 calculates the width of each of the blocks created at Step S69, and extracts only blocks having a predetermined length of width or larger as the character string blocks (Step S70). The processing at Step S70 extracts the character string blocks.

Figure 20:
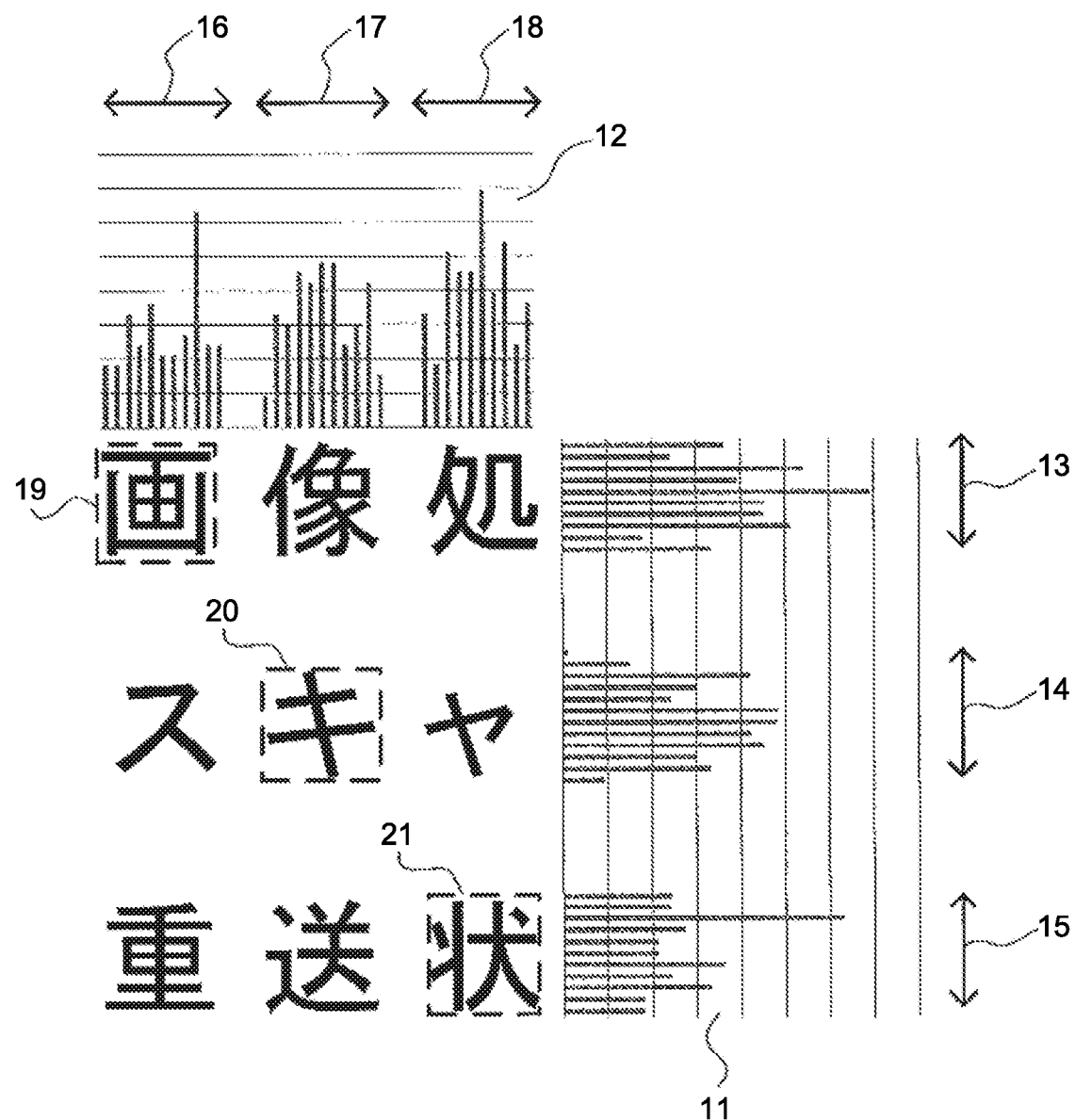
FIG. 20 is an explanatory diagram illustrating an example of rectangular character block extraction processing in the character string area extraction processing of FIG. 19.

FIG. 20 is an explanatory diagram illustrating an example of the rectangular character block extraction processing of the image processing apparatus 100. This example is an example of the case in which the rectangular character blocks are extracted in the character string area extraction processing illustrated in FIG. 19. The character image illustrated in FIG. 20 is the image after being binarized at Step S61 and denoised at Step S62.

At Step S63, the character string extraction unit 100F10 creates, for the character image illustrated in FIG. 20, the histograms in which the number of classes represents the number of pixel positions in one line in the horizontal direction or the vertical direction, and the frequency represents the number of black pixels present in the line. This operation obtains a horizontal histogram 11 and a vertical histogram 12. The character string extraction unit 100F10 extracts the regions containing consecutive classes with frequencies at the certain level or higher from each of the horizontal histogram 11 and the vertical histogram 12. The character string extraction unit 100F10 calculates the widths representing the numbers of classes of the extracted regions, and extracts only the regions having a predetermined width or larger. Regions 13, 14, and 15 are region information extracted from the horizontal histogram. Regions 16, 17, and 18 are region information extracted from the vertical histogram.

The character string extraction unit 100F10 then creates the rectangular regions covering respective characters in the character image as the rectangular character blocks from the extracted pieces of region information in the horizontal direction and the vertical direction. For example, a rectangular character block 19 is obtained from the regions 13 and 16. In the same manner, a rectangular character block 20 is obtained from the regions 14 and 17, and a rectangular character block 21 is obtained from the regions 15 and 18.

Figure 21:
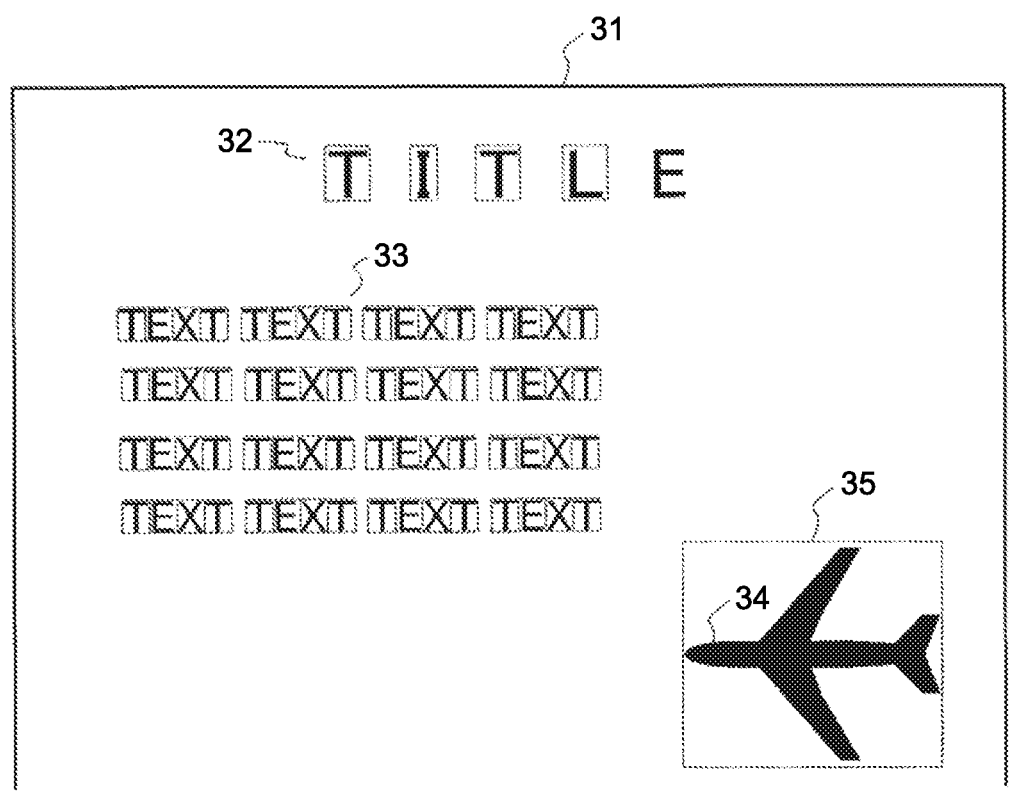
FIG. 21 is an explanatory diagram illustrating an example of the rectangular character block extraction processing in FIG. 20.

FIG. 21 is an explanatory diagram illustrating an example of the rectangular character block extraction processing in FIG. 20. A method for distinguishing the character portion from the picture portion will be described with reference to FIG. 21.

FIG. 21 illustrates the result of the rectangular character block extraction from a document image 31 performed at Step S66. The document image 31 includes a document title portion 32, a character portion 33, and a picture portion 34. FIG. 21 indicates the rectangular character blocks extracted from the respective portions with dotted lines. After performing the rectangular character block extraction processing, the character string extraction unit 100F10 calculates the area of each of the extracted rectangular character blocks.

If the obtained area of a rectangular character block is equal to or larger than a predetermined amount of area, the rectangular character block is excluded from the extraction results. In FIG. 21, a rectangular character region 35 covering the picture portion 34 is extracted, but is excluded from the extraction results because the area of the rectangular character region 35 is equal to or larger than the predetermined amount. The predetermined amount is determined, for example, by setting in advance an amount of area corresponding to a region where a picture appears relative to rectangular blocks corresponding to the sizes of the characters extracted from the document title portion 32 and the character portion 33. When the document includes only the picture portion 34 without including the character portion 33, character string information can be detected if the document includes the character string information in the picture portion 34.

Figure 22A:
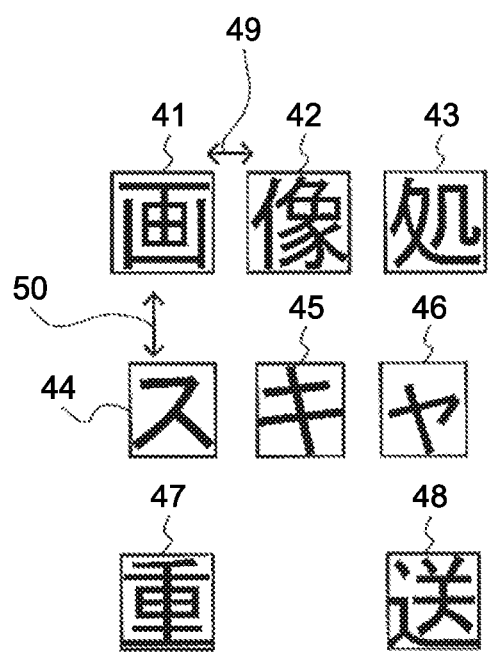
FIGS. 22A and 22B are explanatory diagrams illustrating an example of character string extraction processing in FIG. 18.
Figure 22B:
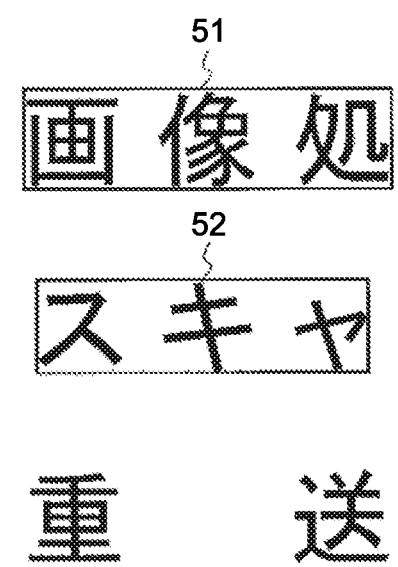

FIGS. 22A and 22B are explanatory diagrams illustrating a specific example of the character string extraction processing. At Step S68, the character string extraction unit 100F10 labels the rectangular character blocks extracted at Step S66. The character string extraction unit 100F10 then compares the distances between the labeled rectangular character blocks, and if blocks are present that lie within the predetermined distance therebetween, connects the blocks to each other into one block. This processing takes advantage of a characteristic that the distance between characters in the same line is generally smaller than the distance between lines in the document image. Regarding, for example, a rectangular character block 41 of FIG. 22A, a distance 49 thereof to a rectangular character block 42 is equal to or smaller than a preset distance, so that the rectangular character blocks 41 and 42 are integrated into one block. In contrast, a distance 50 between the rectangular character block 41 and a rectangular character block 44 is larger than the preset distance, so that the integration into one block is not performed.

FIG. 22B is a diagram illustrating a result of integration of the blocks performed by applying character string block extraction processing to the characters of FIG. 22A. Rectangular character blocks 41, 42, and 43 of FIG. 22A are integrated into one block, and thus, a character string block 51 illustrated in FIG. 22B is obtained. In the same manner, rectangular character blocks 44, 45, and 46 of FIG. 22A are integrated into one block, and thus, a character string block 52 of FIG. 22B is obtained. No rectangular character block is present within the preset distance from the rectangular character blocks 47 and 48 of FIG. 22A, so that the rectangular character blocks 47 and 48 are not extracted as a character string block. The preset distance is a threshold set based on the relation between the distance between characters in the same line and the distance between lines in the document image. The preset distance is stored in the storage device 100H3, and is used when the CPU 100H1 performs the character string block extraction processing.

Figure 23:
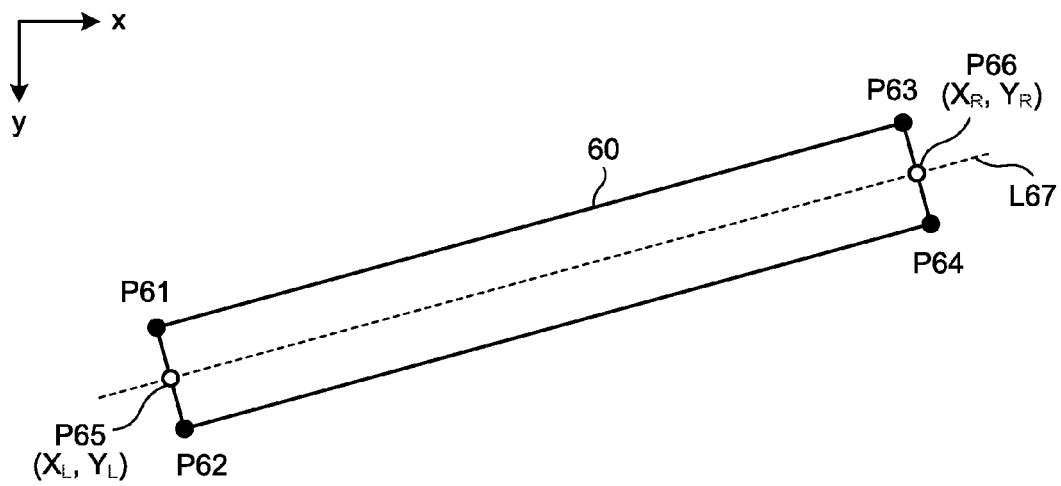
FIG. 23 is an explanatory diagram illustrating an example of character string approximate straight line extraction processing in FIG. 18.

FIG. 23 is an explanatory diagram illustrating a specific example of character string approximate straight line extraction processing. The character string approximate straight line extraction processing is the processing performed at Step S14-2 by the character string approximate straight line inclination comparison/multi-feed determination unit 100F11. The following describes a case of obtaining a character string approximate straight line from each character string block 60. In this processing, with respect to coordinates P61, P62, P63, and P64 at four corners of the character string block 60, center coordinates P65 between the coordinates P61 and the coordinates P62 are obtained. In the same manner, center coordinates P66 between the coordinates P63 and the coordinates P64 are obtained. Where $(X_L, Y_L)$ are the coordinates P65, and $(X_R, Y_R)$ are the coordinates P66, an approximate straight line L67 for the character string block 60 is represented by Expression (1).

$$y - Y_L = [(Y_R - Y_L)/(X_R - X_L)] \cdot (x - X_L) \quad (1)$$

Expression (1) is used to calculate the approximate straight line L67, and the inclination of the approximate straight line L67 can be compared between the respective character string blocks 60.

Figure 24:
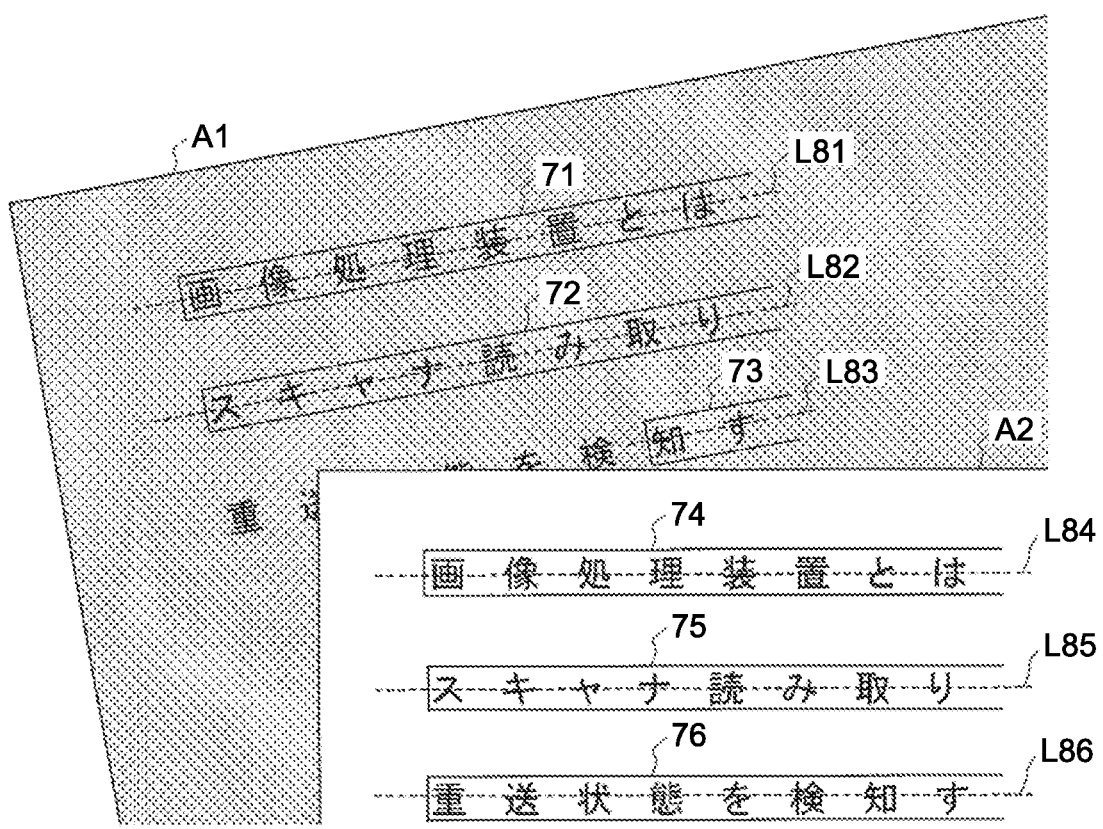
FIG. 24 is an explanatory diagram illustrating an example of character string approximate straight line inclination comparison processing in FIG. 18.

FIG. 24 is an explanatory diagram illustrating a specific example of character string approximate straight line inclination comparison processing.

The character string approximate straight line inclination comparison/multi-feed determination unit 100F11 illustrated in FIG. 17 calculates the approximate straight lines for the character string blocks extracted by the character string extraction processing at Step S14-1, by performing the character string approximate straight line extraction processing at Step S14-2. The character string approximate straight line inclination comparison/multi-feed determination unit 100F11 subsequently compares the inclinations of the character string blocks based on the approximate linear equations for the character string blocks, by performing the character string approximate straight line inclination comparison processing at Steps S14-3. If a difference between the inclinations is equal to or larger than a predetermined angle, the document is determined to be in the multi-feed state (for example, in the state of FIG. 3A). This processing is the processing at Step S14-4. In the case of FIG. 24, differences between angles of approximate straight lines L81, L82, and L83 are within the predetermined angle, so that the document is not determined to be in the multi-feed state. However, if the difference between angles is equal to or larger than the predetermined angle when the approximate straight line L83 is compared with an approximate straight line L84, the character string approximate straight line inclination comparison/multi-feed determination unit 100F11 determines that the two documents G1 and G2 are in the multi-feed state at Step S15. The rest of the components not described above are configured in the same manner, and serve in the same manner, as those of Example 1.

In Example 2, the approximate straight line L67 for the character string is calculated, and the documents G1 and G2 are determined to be in the multi-feed state based on the difference in the inclination of the approximate straight line L67. This enables the detection of the multi-feed state of the documents G1 and G2 even when the data read from one of the documents G1 and G2 is entirely included in the data read from the other of the documents G1 and G2. As a result, the multi-feed state of the documents G1 and G2 can be detected using image processing regardless of how the two documents G1 and G2 overlap each other. That is, the multi-feed state of the documents G1 and G2 can be detected regardless of the state of overlapping, by evaluating the continuity of the edges and comparing the area size covering the document area with the document size entered by the user, and in addition, by using the inclination of the approximate straight line L67 in the document as a determination condition of the multi-feed.

When the present invention is associated with the present embodiment as described above, the following advantageous effects are obtained. In the following description, components described in claims are associated with the components described in the present embodiment, and when a term differs therebetween, the term used in the present embodiment is bracketed to clarify the correspondence relation therebetween.

(1) According to the embodiment, an information processing apparatus (image processing apparatus 100) includes the reading unit 100F1 that optically reads the image of the document 1 to generate image data; the edge extraction unit 100F2 that extracts an edge of the document from the image data generated by the reading unit; feature point search units (upper side and lower side feature point search units 100F3 and 100F4) that search the edge data of the edge extracted by the edge extraction unit 100F2 for the feature point; the document area size calculation unit 100F6 that calculates the document area size from the feature point information (coordinates P1, P2, P3, and P4) found by the upper side and lower side feature point search units 100F3 and 100F4; and the user operation unit 100F7 used by the user to specify the document size; and the document size comparison/multi-feed determination unit 100F9 that by compares the document area size calculated in the document area size calculation unit with the user-specified document area size so as to determine whether multi-feed of the document has occurred. Therefore, the multi-feed of the documents G1 and G2 can be detected using image processing regardless of how the two documents G1 and G2 overlap each other, based on the image data of the read image of the documents.

(2) According to the embodiment, in the information processing apparatus (image processing apparatus 100) described above, the edge extraction unit 100F2 performs the filter processing (Step S21) to extract an edge in the lateral direction from the image data. Therefore, the upper side and lower side portions of the document area can be extracted as edges.

(3) According to the embodiment, in the information processing apparatus (image processing apparatus 100) described above, the feature point search units (upper side and lower side feature point search units 100F3 and 100F4) detect the left end edge coordinates PTa and PBa serving as the coordinates at the leftmost end of the edge, the right end edge coordinates PTb and PBb serving as the coordinates at the rightmost end of the edge, and a plurality of straight line representative points (coordinates PT1 to PT4 and coordinates PB1 to PB4) on the edge. Therefore, the four linear equations L1, L2, L3, and L4 constituting the document area (distances W1, W2, H1, and H2) can be calculated.

(4) According to the embodiment, in the information processing apparatus (image processing apparatus 100) described above, each of the feature point search units (upper side and lower side feature point search units 100F3 and 100F4) evaluates the continuity of the edge, and detects the multi-feed (Step S15) if no sufficiently long edge is detected (No at Step S5, and No at Step S7). Therefore, the multi-feed state can be detected based on the continuity of the extracted edge, in addition to using the method of comparing the document area size.

(5) According to the embodiment, the information processing apparatus (image processing apparatus 100) described above further includes a comparison/determination unit (inclination comparison/determination unit 100F5) that obtains the linear equations L1, L2, L3, and L4 of the upper side and the lower side of the document based on information on the feature point (coordinates P1, P2, P3, and P4), that compares the information on inclinations of the upper side and the lower side, and that detects the multi-feed if the inclinations disagree (Steps S8, S9, S10, S11, and S15). Therefore, the multi-feed can be detected by comparing the inclinations of the upper side and the lower side of the document, in addition to comparing the document area size.

(6) According to the embodiment, in the information processing apparatus (image processing apparatus 100) described above, the multi-feed determination unit (document size comparison/multi-feed determination unit 100F9) compares the calculated document area size with the user-specified document size, and determines that the document is in the multi-feed state (Step S15) if the sizes disagree (Step S13, and No at Step S14). Therefore, the multi-feed state can be detected even when two sheets of the document 1 have the same inclination.

(7) According to the embodiment, in the information processing apparatus (image processing apparatus 100) described above, the multi-feed determination unit includes the character string extraction unit 100F10 that extracts character strings from the image data generated by the reading unit; and the character string approximate straight line inclination comparison/multi-feed determination unit 100F11 that compares the inclinations of the approximate straight lines for respective rows of the character strings, the approximate straight lines having been calculated from the character strings extracted by the character string extraction unit 100F10, to determine that the document is in the multi-feed state if the compared inclinations differ from one another by an angle equal to or larger than a predetermined value. Therefore, the multi-feed state can be detected based on the difference in the inclinations of the character strings even when a reading range of a document is overlapped by another document.

(8) According to the embodiment, an information processing system includes the information processing apparatus (image processing apparatus 100) described above; and the image forming apparatus to form an image. Therefore, the information processing system can be built that provides the advantageous effects of the information processing apparatus described above.

(9) According to the embodiment, an information processing method includes optically reading the document 1 to generate image data, using the reading unit 100F1 (Step S2); extracting an edge of the document from the generated image data, using the edge extraction unit 100F2 (Step S3); searching the extracted data of the extracted edge for a feature point, using the feature point search unit (upper side and lower side feature point search units 100F3 and 100F4) (Steps S4 and S6); calculating the document area size from the found feature point, using the document area size calculation unit 100F6 (Step S12); comparing the calculated document area size with user-specified document size specified through the user operation unit 100F7 (Step S13); and determining whether the document is multi-fed, based on the result of the comparison (Steps S14 and S15). Therefore, the multi-feed of the documents G1 and G2 can be detected using image processing regardless of how the two documents G1 and G2 overlap each other, based on the image data of the read image of the documents.

(10) According to the embodiment, a computer program product includes a non-transitory computer-readable medium including a computer program. The computer program causes a computer (CPU 100H1) to execute optically reading the document 1 to generate image data; extracting an edge of the document from the generated image data (Step S3); searching the edge data of the extracted edge for a feature point (Steps S4 and S6); calculating the document area size from the found feature point (Step S12); comparing the calculated document area size with user-specified document size specified from the user operation unit 100F7 (Step S13); and determining whether the document is multi-fed, based on the result of the comparison (Steps S14 and S15). The computer program is downloaded to the computer (CPU 100H1), and the computer (CPU 100H1) executes the computer program. Therefore, the multi-feed of the documents G1 and G2 can be detected using image processing regardless of how the two documents G1 and G2 overlap each other, based on the read image data of the document 1.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An information processing apparatus comprising:
an operation panel that transmits a user-specified document size;
memory storing computer-readable instructions; and
one or more processors configured to execute the computer-readable instructions such that the one or more processors are configured to perform operations including,
optically reading a document to generate image data;
extracting an edge of the document from the generated image data generated;
searching edge data of the extracted edge for a feature point;
calculating a document area size from the feature point;
comparing the calculated document area size with a user-specified document size so as to determine whether multi-feed of the document has occurred;
extract character strings from the generated image data;
calculate approximate straight lines for respective rows of the character strings from the extracted character strings; and compare inclinations of the calculated approximate straight lines for respective rows of the character strings, the document being determined to be in the multi-feed state if the compared inclinations differ from one another by an angle equal to or larger than a predetermined value.

2. The information processing apparatus according to claim 1, wherein the one or more processors are further configured to extract, as the edge, an upper side portion and a lower side portion of the document so as to generate an edge image.

3. The information processing apparatus according to claim 1, wherein the one or more processors are further configured to detect left end edge coordinates serving as coordinates at a leftmost end of the edge, right end edge coordinates serving as coordinates at a rightmost end of the edge, and a plurality of straight line representative points on the edge.

4. The information processing apparatus according to claim 1, wherein the one or more processors are further configured to evaluate continuity of the edge, and to determine that the document is in a multi-feed state if no sufficiently long edge is detected.

5. The information processing apparatus according to claim 1, wherein the one or more processors are further configured to obtain linear equations of the upper side and the lower side of the document based on information on the feature point, to compare information on inclinations of the upper side and the lower side of the document, and to determine that the document is in the multi-feed state if the inclinations disagree.

6. The information processing apparatus according to claim 1, wherein the one or more processors are further configured to compare the calculated document area size with the user-specified document size, and to determine that the document is in the multi-feed state if the sizes disagree.

7. An information processing system comprising:
the information processing apparatus according to claim 1; and
an image forming apparatus to form an image.

8. An information processing method comprising:
entering a user specified document area size into an information processing apparatus;
optically reading a document to generate image data, using an image reader;
extracting an edge of the document from the generated image data via one or more processors of the information processing apparatus;
searching the extracted data of the extracted edge for a feature point via one or more processors of the information processing apparatus;
calculating a document area size from the found feature point via one or more processors of the information processing apparatus;
comparing the calculated document area size with user-specified document size via one or more processors of the information processing apparatus;
extracting character strings from the generated image data;
calculating approximate straight lines for respective rows of the character strings from the extracted character strings; and
comparing inclinations of the calculated approximate straight lines for respective rows of the character strings, the document being determined to be in the multi-feed state if the compared inclinations differ from one another by an angle equal to or larger than a predetermined value; and
determining, via one or more processors of the information processing apparatus, whether the document is multi-fed, based on the result of the comparison.

9. A computer program product comprising a non-transitory computer-readable medium including a computer program that causes a computer to execute:
optically reading a document to generate image data;
extracting an edge of the document from the generated image data;
searching the edge data of the extracted edge for a feature point;
calculating a document area size from the found feature point;
comparing the calculated document area size with user-specified document size specified through a user operation unit;
extracting character strings from the generated image data;
calculating approximate straight lines for respective rows of the character strings from the extracted character strings; and
comparing inclinations of the calculated approximate straight lines for respective rows of the character strings, the document being determined to be in the multi-feed state if the compared inclinations differ from one another by an angle equal to or larger than a predetermined value; and
determining whether the document is multi-fed, based on the result of the comparison.

\* \* \* \* \*